United States Patent
Dowling

(10) Patent No.: US 6,636,499 B1
(45) Date of Patent: Oct. 21, 2003

(54) APPARATUS AND METHOD FOR CLUSTER NETWORK DEVICE DISCOVERY

(75) Inventor: Mary G. Dowling, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/453,163

(22) Filed: Dec. 2, 1999

(51) Int. Cl.$^7$ ................................................ H04Q 7/24
(52) U.S. Cl. ...................... 370/338; 370/338; 370/389; 370/388
(58) Field of Search ................................ 709/220–226, 709/201; 370/386, 389, 397, 399, 400, 401, 408, 409; 710/8

(56) References Cited

U.S. PATENT DOCUMENTS

| | | | |
|---|---|---|---|
| 4,644,532 A | 2/1987 | George et al. ................. 370/94 |
| 4,922,486 A | 5/1990 | Lidinsky et al. ............... 370/60 |
| 4,933,937 A | 6/1990 | Konishi ..................... 370/85.13 |
| 4,962,497 A | 10/1990 | Ferenc et al. ............... 370/60.1 |
| 5,095,480 A | 3/1992 | Fenner ....................... 370/94.1 |
| 5,136,580 A | 8/1992 | Videlock et al. .............. 370/60 |
| 5,241,682 A | 8/1993 | Bryant et al. ................ 395/800 |
| 5,274,631 A | 12/1993 | Bhardwaj ..................... 370/60 |
| 5,280,480 A | 1/1994 | Pitt et al. .................. 370/85.13 |
| 5,287,103 A | 2/1994 | Kasprzyk et al. ...... 340/825.52 |
| 5,319,644 A | 6/1994 | Liang ......................... 370/85.5 |
| 5,371,852 A | 12/1994 | Attanasio et al. ............ 395/200 |
| 5,394,402 A | 2/1995 | Ross .......................... 370/94.1 |
| 5,430,715 A | 7/1995 | Corbalis et al. ............... 370/54 |
| 5,530,963 A | 6/1996 | Moore et al. .......... 395/200.15 |
| 5,594,732 A | 1/1997 | Bell et al. ................... 370/401 |
| 5,617,421 A | 4/1997 | Chin et al. .................. 370/402 |
| 5,715,394 A | 2/1998 | Jabs ......................... 395/200.11 |
| 5,793,763 A | 8/1998 | Mayes et al. ................ 370/389 |
| 5,802,047 A | 9/1998 | Kinoshita .................... 370/359 |
| 5,812,529 A | 9/1998 | Czarnik et al. .............. 370/245 |
| 5,835,720 A | 11/1998 | Nelson et al. ......... 395/200.54 |
| 5,835,725 A | 11/1998 | Chiang et al. ......... 395/200.58 |
| 5,854,901 A | 12/1998 | Cole et al. ............. 395/200.75 |
| 5,918,016 A | 6/1999 | Brewer et al. ........... 395/200.5 |
| 5,968,116 A | 10/1999 | Day, II et al. .............. 709/202 |
| 5,991,828 A | * 11/1999 | Horie et al. .................... 710/8 |
| 6,009,103 A | 12/1999 | Woundy ...................... 370/401 |
| 6,023,724 A | 2/2000 | Bhatia et al. ................ 709/218 |
| 6,026,441 A | 2/2000 | Ronen ......................... 709/227 |
| 6,046,992 A | * 4/2000 | Meier et al. ................. 370/338 |
| 6,055,236 A | 4/2000 | Nessett et al. .............. 370/389 |
| 6,091,951 A | 7/2000 | Sturniolo et al. ............ 455/432 |
| 6,119,160 A | 9/2000 | Zhang et al. ............... 709/224 |
| 6,370,142 B1 | * 4/2002 | Pitcher et al. ............... 370/390 |

* cited by examiner

Primary Examiner—Douglas Olms
Assistant Examiner—Robert W. Wilson
(74) Attorney, Agent, or Firm—Thelen Reid & Priest, LLP; David B. Ritchie

(57) ABSTRACT

A group of network devices, such as Ethernet switches, are logically configured as a single cluster, with one commander device and one or more member devices. Each network device capable of belonging to a cluster transmits data packets containing cluster capability information to its neighbors. Each network device capable of belonging to a cluster that receives data packets containing cluster capability information maintains a database containing information about its cluster-capable neighbor devices. The commander device of a cluster is the point-of-contact through which the cluster is managed. The commander device maintains a database of neighbors of the entire cluster. Upon user request, the commander device displays a list of cluster neighbors and notes which ones may be added to the cluster. When the user adds a device to the cluster, that device immediately sends its database of discovered neighbors to the commander device. The commander device adds those neighbors to its database and displays them at the user's next request. Thus, a user is informed of which switches are available to be added to a cluster at any given time.

50 Claims, 9 Drawing Sheets

APPARATUS AND METHOD FOR CLUSTER NETWORK DEVICE DISCOVERY

BACKGROUND OF THE INVENTION

1. Field of the Invention

The present invention relates to the field of data communications networks. More particularly, the present invention relates to an apparatus and method for automatic network device cluster discovery.

2. Background

A network is a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. The network typically includes a cable that attaches to network interface cards ("NICs") in each of the devices within the network. Users may interact with network-enabled software applications to make a network request, such as to get a file or print on a network printer. The application may also communicate with the network software, which may then interact with the network hardware to transmit information to other devices attached to the network.

A local area network ("LAN") is a network that is located in a relatively small physical area, such as a building, in which computers and other network devices are linked, usually via a wiring-based cabling scheme. A LAN typically includes a shared medium to which workstations attach and through which they communicate. LANs often use broadcasting methods for data communication, whereby any device on the LAN can transmit a message that all other devices on the LAN then "listen" to. However, only the device or devices to which the message is addressed actually receive the message. Data is typically packaged into frames for transmission on the LAN.

Currently, the most common LAN media is Ethernet, which traditionally has a maximum bandwidth of 10 Mbps. Traditional Ethernet is a half-duplex technology, in which each Ethernet network device checks the network to determine whether data is being transmitted before it transmits, and defers transmission if the network is in use. In spite of transmission deferral, two or more Ethernet network devices can transmit at the same time, which results in a collision. When a collision occurs, the network devices enter a back-off phase and retransmit later.

As more network devices are added to a LAN, they must wait more often before they can begin transmitting, and collisions are more likely to occur because more network devices are trying to transmit. Today, throughput on traditional Ethernet LANs suffers even more due to increased use of network-intensive programs, such as client-server applications, which cause hosts to transmit more often and for longer periods of time.

FIG. 1 is a block diagram illustrating a network connection between a user 10 and a server 20. FIG. 1 is an example which may be consistent with any type of network, including a LAN, a wide area network ("WAN"), or a combination of networks, such as the Internet.

When a user 10 connects to a particular destination, such as a requested web page on a server 20, the connection from the user 10 to the server 20 is typically routed through several routers 12A–12D. Routers are internetworking devices. They are typically used to connect similar and heterogeneous network segments into Internetworks. For example, two LANs may be connected across a dial-up line, across the Integrated Services Digital Network ("ISDN"), or across a leased line via routers. Routers may also be found throughout the Internet. End users may connect to a local Internet Service Provider ("ISP") (not shown).

As the data traffic on a LAN increases, users are affected by longer response times and slower data transfers, because all users attached to the same LAN segment compete for a share of the available bandwidth of the LAN segment (e.g., 10 Mbps in the case of traditional Ethernet). Moreover, LANs commonly experience a steady increase in traffic even if the number of users remains constant, due to increased network usage of software applications using the LAN. Eventually, performance drops below an acceptable level and it becomes necessary to separate the LAN into smaller, more lightly loaded segments.

LANs are becoming increasingly congested and overburdened. In addition to an ever-growing population of network users, several factors have combined to stress the capabilities of traditional LANs, including faster computers, faster operating systems, and more network-intensive software applications.

There are two traditional approaches to relieving LAN congestion. The first is to simply install a faster networking technology, such as FDDI, ATM, or Fast Ethernet. However, these approaches are expensive to implement. The other traditional approach is to use bridges and routers to reduce data traffic between networks. This solution is also relatively expensive both in money and configuration time, and is only effective when inter-segment traffic is minimal. When inter-segment traffic is high, some bridges and routers can become a bottleneck due to their limited processing power. They also require extensive setup and manual configuration in order to maintain their performance. In addition, despite large buffers, packet loss is always a possibility.

Switching is a technology that alleviates congestion in Ethernet, Token Ring, and Fiber Distributed Data Interface (FDDI) and other similar LANs by reducing traffic and increasing bandwidth. LAN switches are designed to work with existing media infrastructures so that they can be installed with minimal disruption of existing networks.

A Media Access Control ("MAC") address is the unique hexadecimal serial number assigned to each Ethernet network device to identify it on the network. With Ethernet devices, this address is permanently set at the time of manufacture. Each network device has a unique MAC address, so that it will be able to receive only the frames that were sent to it. If MAC addresses were not unique, there would be no way to distinguish between two stations. Devices on a network monitor network traffic and search for their own MAC address in each frame to determine whether they should decode it or not. Special circumstances exist for broadcasting to every device on the network.

Ethernet uses variable-length frames of data to transmit information from a source to one or more destinations. Every Ethernet frame has two fields defined as the source and destination addresses, which indicate the MAC addresses of the network devices where a frame originated and where it is ultimately destined, respectively. FIG. 2-A illustrates the structure of an Ethernet frame, as defined by the IEEE. As shown in FIG. 2-A, the Ethernet frame 22 includes a Preamble 24, a Start of Frame Delimiter 26, a Destination Address 28, a Source Address 30, a Length of data field 32 (sometimes used as a Protocol Type field), a variable-length Data field 34, a Pad 36, and a Checksum 38. The Preamble 24 is a seven-byte field, with each byte containing the bit pattern 10101010 to allow for clock synchronization between sending and receiving stations (not shown). The Start of Frame Delimiter 26 is a one-byte field containing the bit pattern 10101011 to denote the start of the frame itself. The Destination Address 28 and the Source Address 30 are typically six-byte fields which specify the unique MAC addresses of the receiving and sending stations. Special addresses allow for multicasting to a group of stations and for broadcasting to all stations on the network. The Length of Data field 32 specifies the number of bytes present in the Data field 34, from a minimum of 0 to a maximum of 1500. The Pad field 36 is used to fill out the length of the entire frame 22 to a minimum of 64 bytes when the Data field 34 contains a small number of bytes. Finally, the Checksum field 38 is a 32-bit hash code of the Data field 34, which can used by the receiving station to detect data transmission errors.

In the context of the present invention, the term "switching" refers to a technology in which a network device (known as a switch) connects two or more LAN segments. A switch transmits frames of data from one segment to their destinations on the same or other segments. When a switch begins to operate, it examines the MAC address of the frames that flow through it to build a table of known sources. If the switch determines that the destination of a frame is on the same segment as the source of the frame, it drops, or filters, the frame because there is no need to transmit it. If the switch determines that the destination is on another segment, it transmits the frame onto the destination segment only. Finally, using a technique known as flooding, if the destination segment is unknown, the switch transmits the frame on all segments except the source segment.

Logically, a LAN switch behaves similarly to a bridge, which is a different kind of network device. The primary difference is that switches have higher data throughput than bridges, because their frame forwarding algorithms are typically performed by application-specific integrated circuits ("ASICs") especially designed for that purpose, as opposed to the more general purpose (and relatively slower) microprocessors typically used in bridges. Like bridges, switches are designed to divide a large, unwieldy local network into smaller segments, insulating each segment from local traffic on other segments, thus increasing aggregate bandwidth while still retaining full connectivity. Switches typically have higher port counts than bridges, allowing several independent data paths through the device. This higher port count also increases the data throughput capabilities of a switch.

Because a switch maintains a table of the source MAC addresses received on every port, it "learns" to which port a station is attached every time the station transmits. Then, each packet that arrives for that station is forwarded only to the correct port, eliminating the waste of bandwidth on the other ports. Since station addresses are checked every time a switch receives a packet from a station, if a station is relocated, the switch will reconfigure its forwarding table immediately upon receiving a transmission from the station.

Referring now to FIG. 2-B, a block diagram of an Ethernet switch according to one aspect of the present invention is shown. As shown in FIG. 2-B, Ethernet switch 200 includes a Layer 1 Physical Interface ("PHY") 202, 204, and a Layer 2 Media Access Control Interface ("MAC") 206, 208, for each port on the Ethernet switch 200. A network interface card ("NIC") consists of a MAC and a PHY. An Ethernet switch also contains a MAC and PHY on every port. Thus, an Ethernet switch may appear to a network as multiple NICs coupled together. Each switch PHY 202, 204, receives the incoming data bit stream and passes it to its corresponding MAC 206, 208, which reassembles the original Ethernet frames.

Ethernet switch 200 also includes a frame buffer memory 210, 212, for each port, a source address table memory 220, discovery protocol logic 230, learning logic 240, forwarding logic 250, packet redirection logic 260, and a configuration and management interface 270. During operation, the learning logic 240 will look at the source address ("SA") within a received Ethernet frame and populate the Source Address Table ("SAT") memory 220 with three columns: MAC address 280, port number 282, and age 284. The MAC address is the same as the source address that a sender has embedded into the frame. The age item will be a date stamp to indicate when the last frame was received from a particular MAC SA. In the example shown in FIG. 2-B, the port number may be 1 or 2. The SAT is also known as the Switch Forwarding Table ("SFT").

Forwarding logic 250 examines at the destination address ("DA") of a received Ethernet frame. This now becomes the new MAC address, which is then compared with the entries in the SAT. Four different forwarding options are possible. If the destination address is a specific address, known as a "broadcast" address, the frame is destined for all ports on the network. In this case, the Ethernet switch will forward the frame to all ports, except the one on which the frame was received. A broadcast address is six bytes with all ones, or "FF.FF.FF.FF.FF.FF" in hexadecimal notation. If the MAC address is found in the SAT and the corresponding port number is different from the received port, the frame is forwarded to that particular port number only. If the MAC address is found in the SAT and the port number is the same as the received port number, the frame is not forwarded; instead, it is discarded. This is known as "filtering." The frame is discarded because the transmitting station and the receiving station are connected on the same shared LAN segment on that particular port and the receiver has already tuned into the frame. If the MAC address is not found in the table, the frame is forwarded to all ports. The reason a particular destination address is not present in the SAT table is that the receiving device could be new on the network, or the recipient has been very quiet (has not recently sent a frame). In both cases, the bridge SAT will not have a current entry. Flooding the frame on all ports is the brute way of ensuring that the frame is routed to its intended recipient.

Ethernet switch 200 uses the "age" entry in the SAT to determine whether that MAC address is still in use on the LAN. If the age has exceeded a certain preset value, the entry is removed. This conserves memory space and makes the bridge faster because fewer entries need to be scanned for address matching. Finally, the frame buffer memories 210, 212 will store frames on each port in case there is a backlog of frames to be forwarded.

According to embodiments of the present invention, discovery protocol logic 230 receives, processes, and sends discovery protocol packets to neighboring network devices on the network. Packet redirection logic 260 examines the source and destination addresses of Ethernet packets under control of the configuration and management interface 270 and forwards them to other network devices in a cluster configuration. As known to those skilled in the art, the program code corresponding to discovery protocol logic 230, learning logic 240, forwarding logic 250, packet redirection logic 260, configuration and management interface 270, and other necessary functions may all be stored on a computer-readable medium. Depending on each particular application, computer-readable media suitable for this purpose may include, without limitation, floppy diskettes, hard drives, RAM, ROM, EEPROM, nonvolatile RAM, or flash memory.

An Ethernet LAN switch improves bandwidth by separating collision domains and selectively forwarding traffic to the appropriate segments. FIG. 3 illustrates the topology of a typical Ethernet network 40 in which a LAN switch 42 has been installed. With reference now to FIG. 3, exemplary Ethernet network 40 includes a LAN switch 42. As shown in FIG. 3, LAN switch 42 has five ports: 44, 46, 48, 50, and 52. The first port 44 is connected to LAN segment 54. The second port 46 is connected to LAN segment 56. The third port 48 is connected to LAN segment 58. The fourth port 50 is connected to LAN segment 60. The fifth port 52 is connected to LAN segment 62. The Ethernet network 40 also includes a plurality of servers 64-A–64-C and a plurality of clients 66-A–66-K, each of which is attached to one of the LAN segments 54, 56, 58, 60, or 62. If server 64-A on port 44 needs to transmit to client 66-D on port 46, the LAN switch 42 forwards Ethernet frames from port 44 to port 46, thus sparing ports 48, 50, and 52 from frames destined for client 66-D. If server 64-C needs to send data to client 66-J at the same time that server 64-A sends data to client 66-D, it can do so because the LAN switch can forward frames from port 48 to port 50 at the same time it is forwarding frames from port 44 to port 46. If server 64-A on port 44 needs to send data to client 66-C, which is also connected to port 44, the LAN switch 42 does not need to forward any frames.

Performance improves in LANs in which LAN switches are installed because the LAN switch creates isolated collision domains. Thus, by spreading users over several collision domains, collisions are avoided and performance improves. In addition, many LAN switch installations dedicate certain ports to a single users, giving those users an effective bandwidth of 10 Mbps when using traditional Ethernet.

As a LAN grows, either due to additional users or network devices, additional switches must often be added to the LAN and connected together to provide more ports and new network segments. One way to connect multiple LAN switches together is to cascade them using high-speed ports. However, when cascading LAN switches, the interswitch bandwidth is limited by the number of connections between switches.

Referring now to FIG. 4, two LAN switches 70-A and 70-B are shown, connected in a cascaded configuration. As shown, each of the LAN switches 70-A and 70-B contains eight ports, 72-A–72-H and 74-A–74-H. On each of the LAN switches 70-A and 70-B, four ports 72-A–72-D and 74-A–74-D are connected to computer workstations 76-A–76-D and 76E–76-H, respectively. The other four ports on each LAN switch (i.e., ports 72-E–72-H on LAN switch 70-A, and ports 74E–74-H on LAN switch 70-B) are dedicated to interswitch communication. For example, if each of the four interswitch connections is capable of supporting a 100 Mbps Fast Ethernet channel, the aggregate interswitch communication rate of the switches connected as shown in FIG. 4 is 400 Mbps. However, the total number of ports available for connecting to workstations or other network devices on each LAN switch is diminished due to the dedicated interswitch connections that are necessary to implement the cascaded configuration.

As a LAN grows, network devices are typically added to the LAN and interconnected according to the needs of the particular LAN to which they belong. For example, FIG. 5 illustrates an exemplary group of network devices in a LAN 78, and the interconnections between the network devices in the LAN 78. As shown in FIG. 5, the LAN 78 includes seven network devices: six LAN switches 80-A–80-F and a router 82. Each network device is connected to one or more of the other network devices in the LAN 78. Computer workstations, network printers and other network devices are also connected to the LAN 78, but not shown. It is to be understood that the LAN configuration shown in FIG. 5 is exemplary only, and not in any way limiting.

Regardless of the method used to interconnect them, network devices such as LAN switches need to be configured and managed, because they typically include a number of programmable features that can be changed by a network administrator for optimal performance in a particular network. Without limitation, such features typically include whether each port on the network device is enabled or disabled, the data transmission speed setting on each port, and the duplex setting on each port. Many commercially-available network devices contain embedded HTML Web servers, which allow the network device to be configured and managed remotely via a Web browser.

Traditionally, network device installation includes inserting the device into the network and assigning it an Internet Protocol ("IP") address, which is a 32-bit number assigned to hosts that want to participate in a TCP/IP Internet. The IP address of a network device is a unique address that specifies the logical location of a host or client on the Internet.

Once a network device has been assigned an IP address, a network administrator can enter the device's IP address or URL into a Web browser such as Netscape Navigator™, available from Netscape Communications Corp. of Mountain View, Calif., or Internet Explorer™, available from Microsoft Corporation of Redmond, Wash., to access the network device and configure it from anywhere in the Internet. However, each network device to be configured must have its own IP address, which must be registered with a domain name service ("DNS"). Assigning an IP address to each and every network device is undesirable, because registering IP addresses with a DNS is both costly and cumbersome.

Accordingly, it would be convenient for a network administrator to be able to assign a single IP address to one network device in a cluster, and then to be able to configure and manage all of the network devices in the cluster using this single IP address. Unfortunately, no current mechanism exists to enable this activity. Thus, it is an object of the present invention to provide a method and apparatus which permits an entire cluster of network devices to share a single IP address. A further goal of the present invention is to enable the clustering of LAN switches or other network devices so that they can be managed through a single network device. Another goal of the present invention is to enable the automatic discovery of switches or other network devices on a LAN that are capable and ready to become part of a cluster.

In the prior art, this goal has been met by using special hardware such as ports, cables, and external backbone matrices. However, according to aspects of the present invention, this goal is achieved without requiring special hardware, and other devices can be found in a network which are capable of being managed through a single network device using only software.

SUMMARY OF THE INVENTION

A group of network devices, such as Ethernet switches, are logically configured as a single cluster, with one commander device and one or more member devices. Each network device capable of belonging to a cluster transmits data packets containing cluster capability information to its neighbors. Each network device capable of belonging to a cluster that receives data packets containing cluster capability information maintains a database containing information about its cluster-capable neighbor devices. The commander device of a cluster is the point-of-contact through which the cluster is managed. The commander device maintains a database of neighbors of the entire cluster. Upon user request, the commander device displays a list of cluster neighbors and notes which ones may be added to the cluster. When the user adds a device to the cluster, that device immediately sends its database of discovered neighbors to the commander device. The commander device adds those neighbors to its database and displays them at the user's next request. Thus, a user is informed of which switches are available to be added to a cluster at any given time.

BRIEF DESCRIPTION OF THE DRAWINGS

FIG. 2-B is a block diagram of an Ethernet switch in accordance with one aspect of the present invention.

DETAILED DESCRIPTION OF THE PREFERRED EMBODIMENTS

Figure 1:
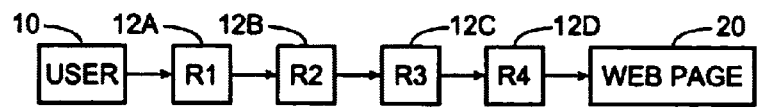
FIG. 1 is a block diagram of an exemplary network connection between a user and server.
Figure 2A:
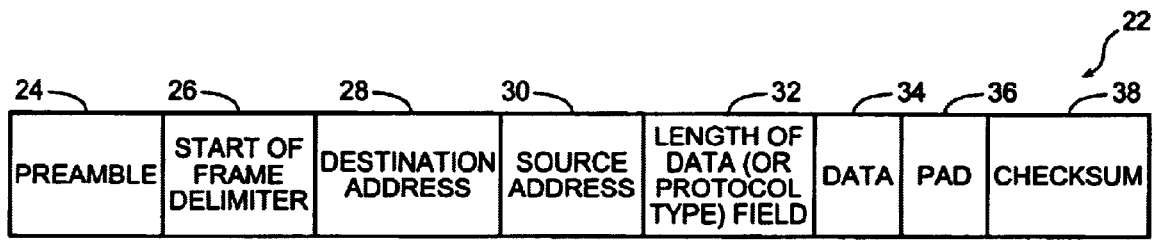
FIG. 2-A is a diagram illustrating the structure of an Ethernet data frame.
Figure 2B:
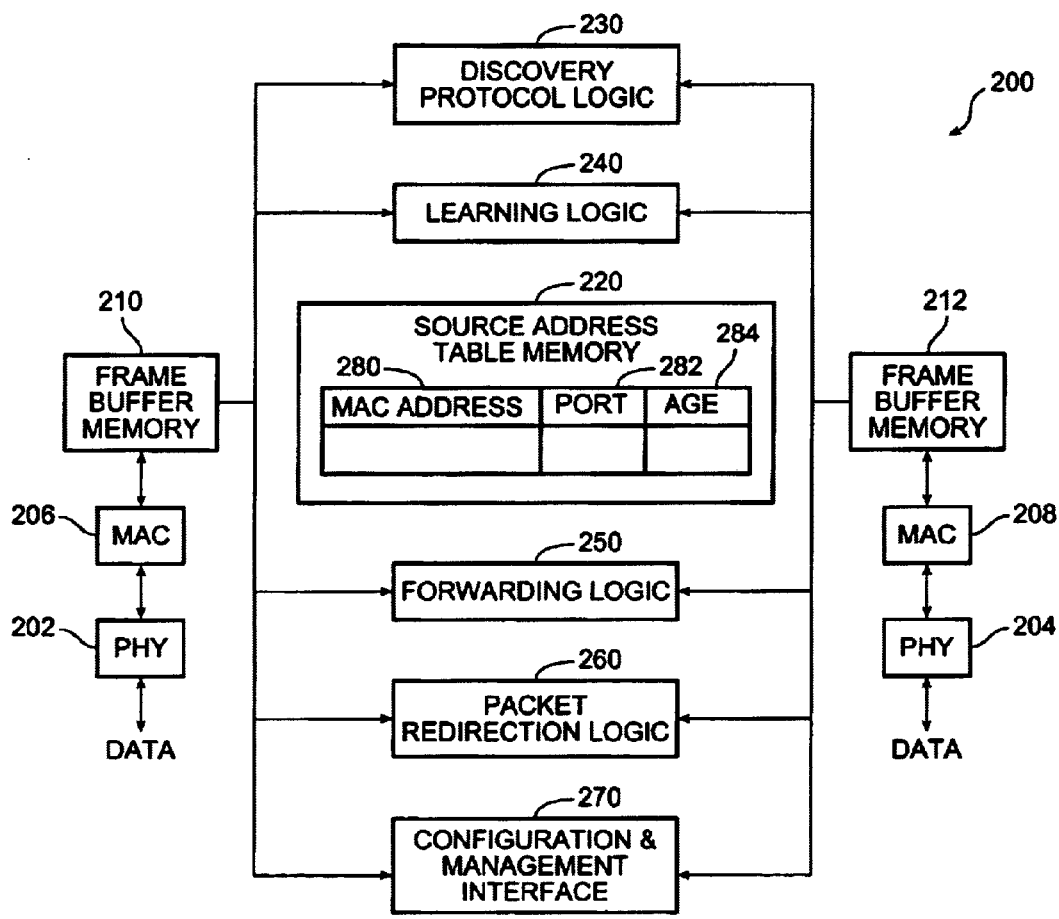
Figure 3:
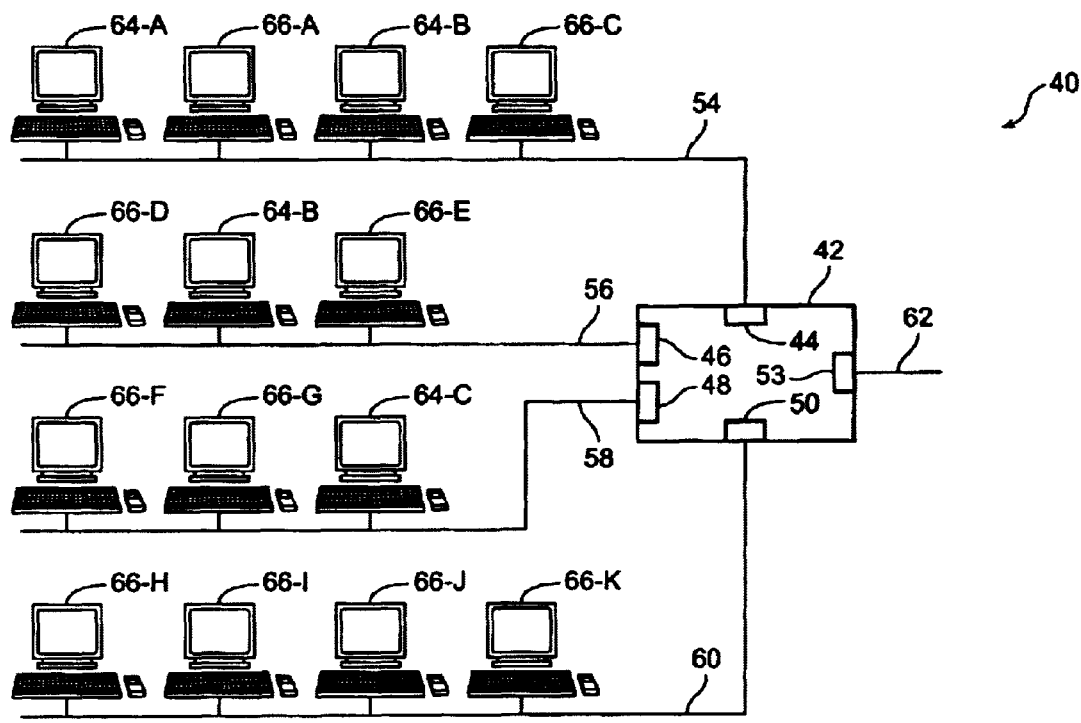
FIG. 3 is a block diagram illustrating the topology of an exemplary LAN incorporating a LAN switch.
Figure 4:
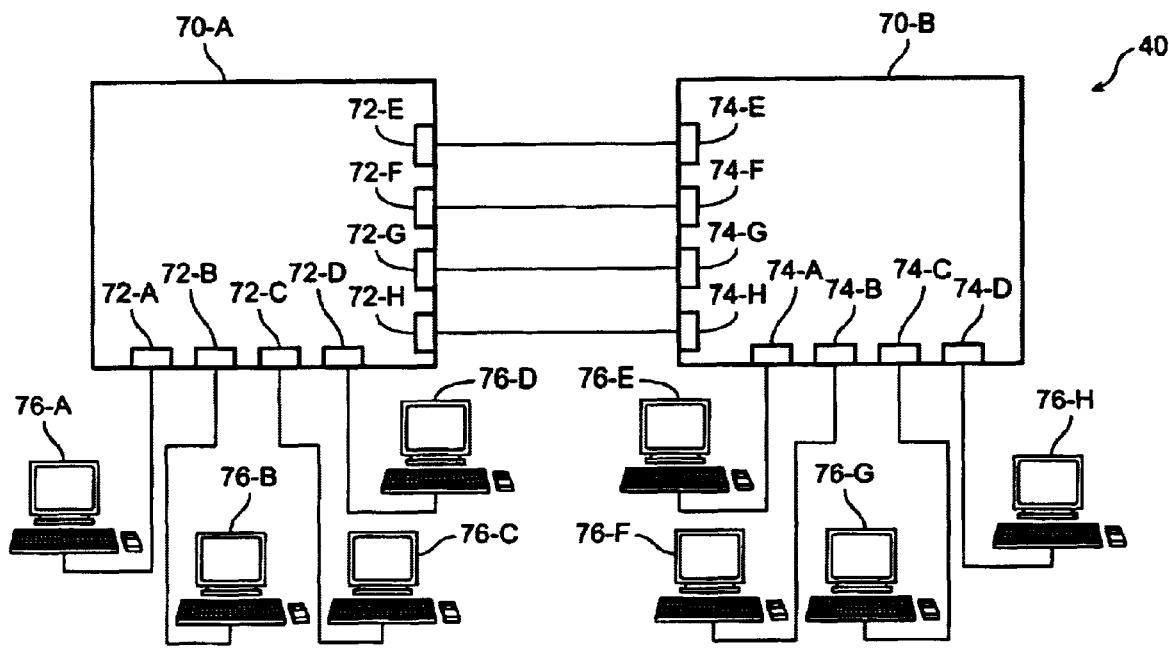
FIG. 4 is a block diagram illustrating an exemplary LAN with two LAN switches interconnected in a cascaded configuration.
Figure 5:
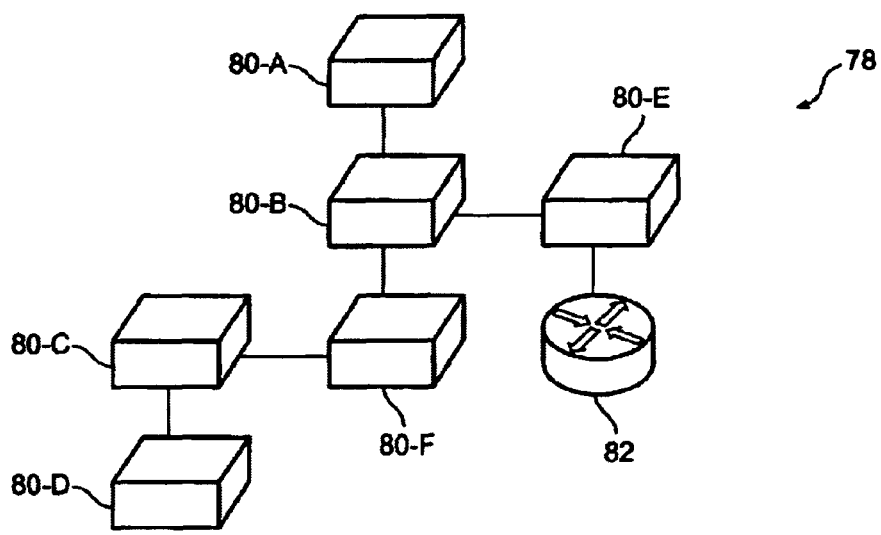
FIG. 5 is a block diagram illustrating the topology of an exemplary LAN incorporating six LAN switches and a router.

Those of ordinary skill in the art will realize that the following description of the present invention is illustrative only and not in any way limiting. Other embodiments of the invention will readily suggest themselves to such skilled persons having the benefit of this disclosure. Network devices, such as LAN switches, may be configured and managed using either out-of-band or in-band techniques. Out-of-band configuration and management are typically performed by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using an SNMP-compatible network management application and the network device's Management Interface Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB.

Embodiments of the present invention use a subset of the Transmission Control Protocol/Internet Protocol ("TCP/IP") suite as the underlying mechanism to transport the SNMP configuration and management data. Without limitation, the protocols implemented in embodiments of the present invention include the Internet Protocol ("IP"), the Internet Control Message Protocol ("ICMP"), the User Datagram Protocol ("UDP"), the Trivial File Transfer Protocol ("TFTP"), the Bootstrap Protocol ("BOOTP"), and the Address Resolution Protocol ("ARP"), all of which are known to those skilled in the art.

The MIB variables of network devices according to embodiments of the present invention are accessible through SNMP. SNMP is an application-layer protocol designed to facilitate the exchange of management information between network devices. SNMP is used to monitor IP gateways and their networks, and defines a set of variables that the gateway must keep and specifies that all operations on the gateway are a side effect of fetching or storing to data variables. SNMP consists of three parts: a Structure of Management Information ("SMI"), a Management Information Base ("MIB") and the protocol itself. The SMI and MIB define and store the set of managed entities, while SNMP itself conveys information to and from the SMI and the MIB.

Instead of defining a large set of commands, SNMP places all operations in a get-request, get-next-request, and set-request format. For example, an SNMP manager can get a value from an SNMP agent or store a value into that SNMP agent. The SNMP manager can be part of a network management system ("NMS"), and the SNMP agent can reside on a networking device such as a LAN switch. The switch MIB files may be compiled with network management software, which then permits the SNMP agent to respond to MIB-related queries being sent by the NMS.

An example of an NMS is the CiscoWorks™ network management software, available from Cisco Systems, Inc. of San Jose, Calif. CiscoWorks™ uses the switch MIB variables to set device variables and to poll devices on the network for specific information. Among other tasks, the CiscoWorkS™ software permits the results of a poll to be displayed as a graph and analyzed in order to troubleshoot internetworking problems, increase network performance, verify the configuration of devices, and monitor traffic loads. Other products known to those of ordinary skill in the art, available from several other vendors, provide similar functionality.

Figure 6:
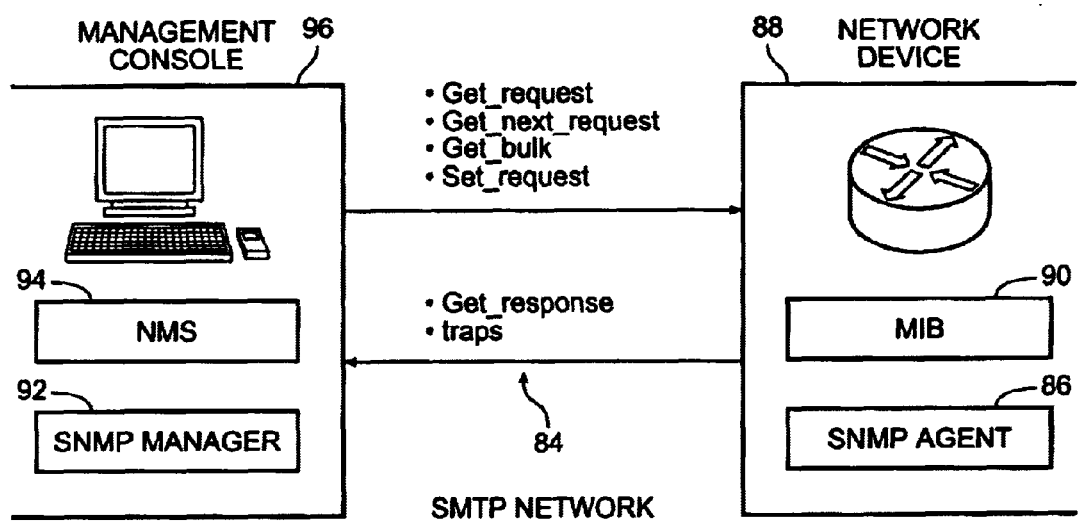
FIG. 6 is a block diagram illustrating an exemplary SNMP network.

Referring now to FIG. 6, an exemplary SNMP network 84 is shown. The SNMP agent 86 in network device 88 gathers data from the MIB 90, also in network device 88. The MIB 90 is the repository for information about device parameters and network data. The SNMP agent 86 can send traps, or notification of certain events, to the SNMP manager 92, which is part of the Network Management Software ("NMS") 94 running on the management console 96. The SNMP manager 92 uses information in the MIB 90 to perform the operations described in Table 1.

TABLE 1

SNMP Manager Operations

| Operation | Description |
|---|---|
| Get-request | Retrieve a value from a specific variable. |
| Get-next-request | Retrieve a value from a variable within a table. With this operation, an SNMP manager does not need to know the exact variable name. A sequential search is performed to find the needed variable within a table. |
| Get-response | The reply to a get-request, get-next-request, and set-request sent by an NMS. |
| Set-request | Store a value in a specific variable. |
| trap | An unsolicited message sent by an SNMP agent to an SNMP manager indicating that some event has occurred. |

Embodiments of the present invention support the following configuration and management interfaces: HTML (web-based) interfaces, SNMP, and a proprietary Internet Operating System ("IOS") command line interpreter ("CLI"). Each of these management interfaces can be used to monitor and configure a LAN switch or a group of switches, known as a cluster. The cluster management tools are web-based, and may be accessed via an ordinary browser, such as Netscape Navigator™ or Microsoft Internet Explorer™. Embedded HTML-based management tools display images of switches and graphical user interfaces.

Figure 7:
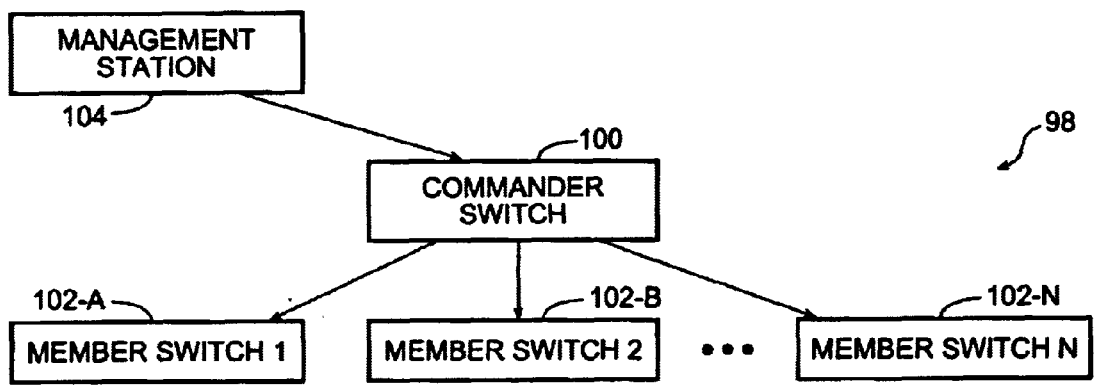
FIG. 7 is a block diagram illustrating a cluster of network devices according to one aspect of the present invention.

When LAN switches are grouped into clusters, one switch is called the commander switch, and the other switches are called member switches. Referring now to FIG. 7, an exemplary switch cluster 98 is shown which includes a commander switch 100 and one or more member switches 102-A–102-N. Management station 104 is connected to the commander switch 100, which redirects configuration requests to the member switches 102-A–102-N.

According to the present invention, a single IP address for the entire cluster 98 is assigned to the commander switch 100, which distributes configuration information to the other switches in the cluster. In one embodiment, a cluster with up to 15 member switches may be configured and managed via the IP address of the commander switch 100. The member switches 102-A–102-N in the cluster do not need individual IP addresses.

Forming a Cluster of Network Devices

Figure 8:
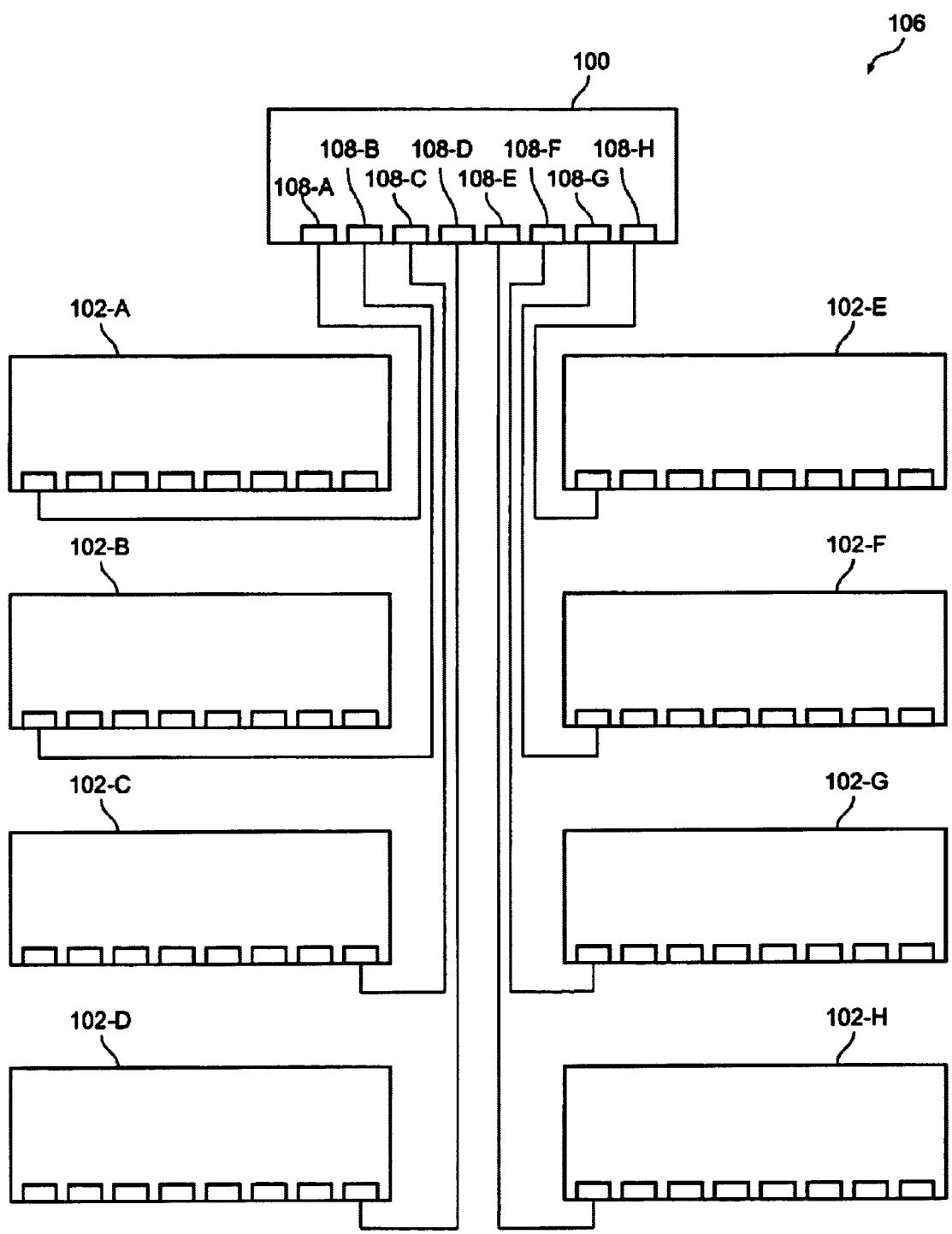
FIG. 8 is a block diagram illustrating a cluster of network devices in a star configuration according to one aspect of the present invention.

A cluster is a group of connected network devices (e.g., LAN switches) that are managed as a single entity. The network devices can be in the same location, or they can be distributed across a network. According to embodiments of the present invention, all communication with cluster switches is through a single IP address assigned to the commander switch. Clusters may be configured in a variety of topologies. As an example, FIG. 8 illustrates a switch cluster 106 configured in a "star," or "radial stack," topology. In this configuration, each of the eight member switches 102-A–102-H in cluster 106 is directly connected to one of the ports 108A–108-H of commander switch 100.

Figure 9:
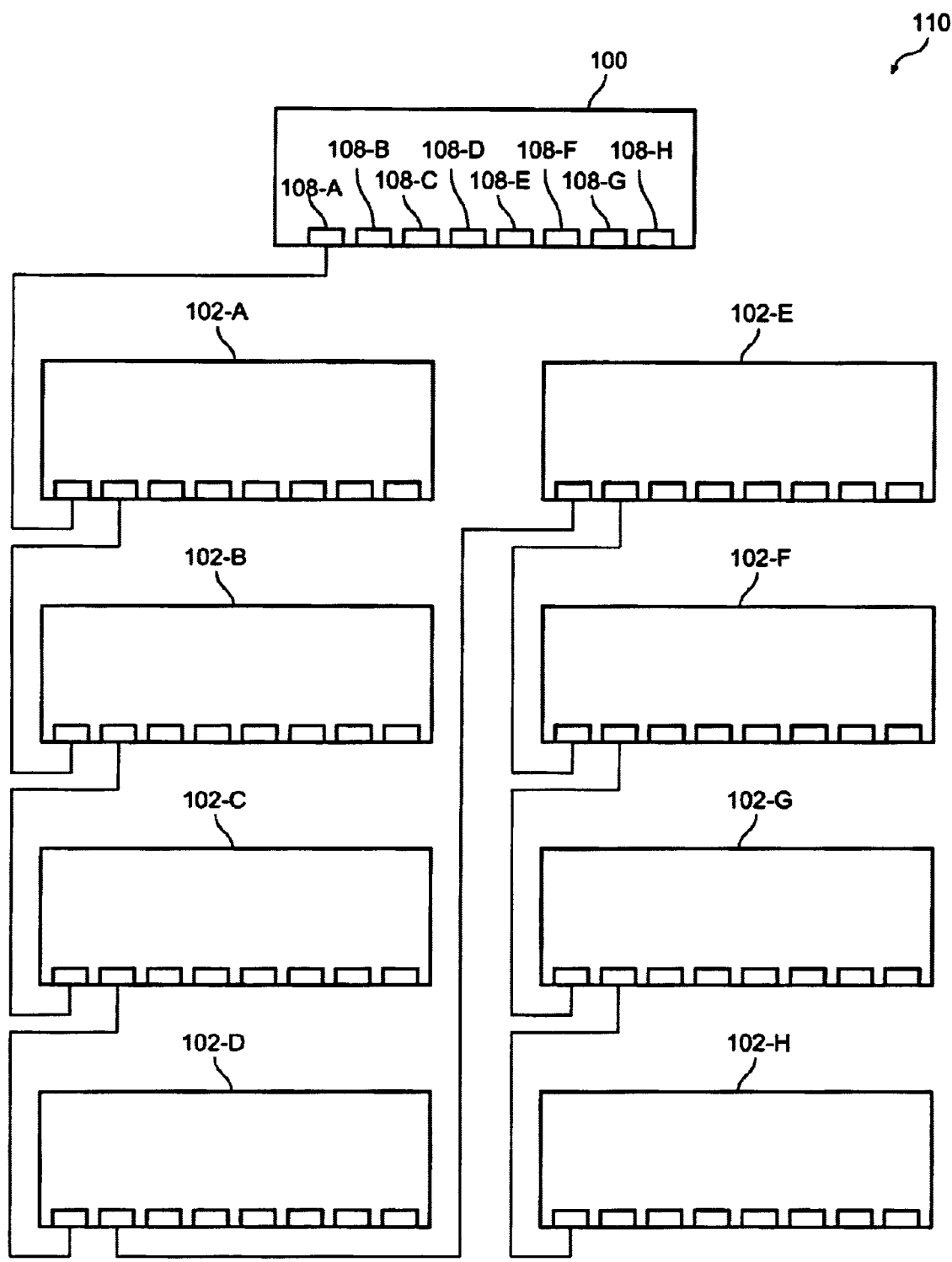
FIG. 9 is a block diagram illustrating a cluster of network devices in a daisy chain configuration according to one aspect of the present invention.

A second example of a cluster configuration, known as a "daisy chain" configuration, is shown in FIG. 9. In cluster 110, only member switch 102-A is directly connected to the commander switch 100. Member switches 102-B–102-G are each connected to an "upstream" switch (one that is fewer "hops" away from commander switch 100) and to a "downstream" switch (one that is more "hops" away from commander switch 100). Finally, the last switch in the chain (member switch 102-H) is only connected to its upstream "neighbor" 102-G.

Figure 10:
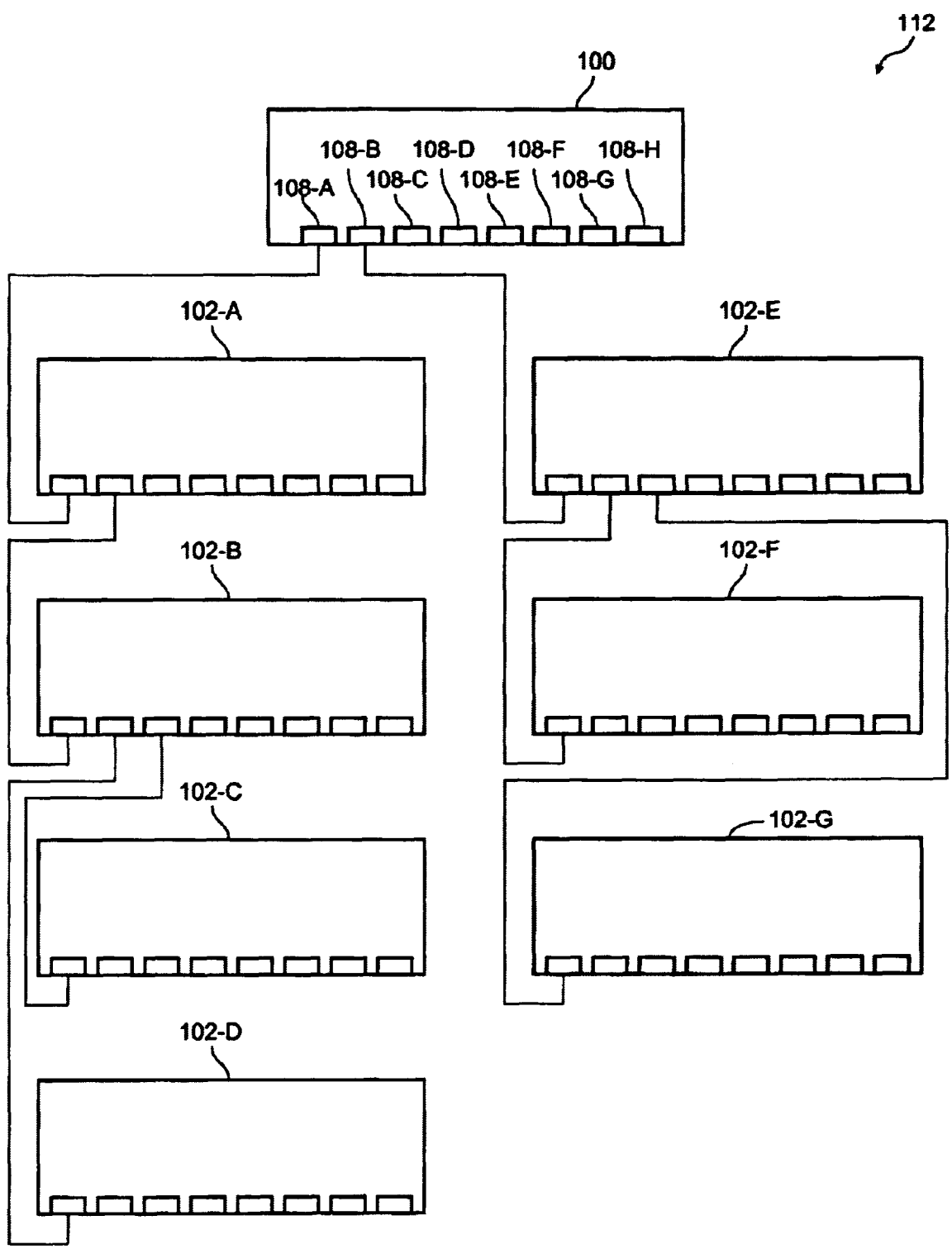
FIG. 10 is a block diagram illustrating a cluster of network devices in a hybrid configuration according to one aspect of the present invention.

As a third example, FIG. 10 illustrates a "hybrid" cluster configuration with one commander switch 100 and seven member switches 102-A–102-G. In cluster 112, member switches 102-A and 102-E are in a star configuration with respect to commander switch 100. Member switch 102-B is in a daisy chain configuration with respect to member switch 102-A, while member switches 102-C and 102-D are in a star configuration with respect to member switch 102-B. Finally, member switches 102-F and 102-G are in a star configuration with respect to member switch 102-E. Thus, hybrid cluster 112 as shown in FIG. 10 consists of a combination of star and daisy chain configurations.

It is to be understood that many more cluster configurations are possible, and that the above examples are not in any way limiting.

The commander switch is the single point of access used to configure and monitor all the switches in a cluster. According to embodiments of the present invention, member switches are managed through a commander switch. The commander switch is used to manage the cluster, and is managed directly by the network management station. Member switches operate under the control of the commander. While they are a part of a cluster, member switches are not managed directly. Rather, requests intended for a member switch are first sent to the commander, then forwarded to the appropriate member switch in the cluster.

When switches are first installed, they are cabled together according to the network configuration desired for a particular application, and an IP address is assigned to the commander switch. In addition, the commander switch must be enabled as the commander switch of the cluster. Once the commander switch has been enabled, it can use information known about the network topology to identify other network devices in the network that may be added to the cluster. According to one embodiment of the present invention, the commander switch uses the Cisco™ Discovery Protocol ("CDP") to automatically identify candidate network devices. However, other similar products known to those of ordinary skill in the art are available from other vendors to accomplish the same task. Alternatively, discovery of candidate network devices may be performed manually by inspecting the network topology and the network devices attached to the network.

CDP is a media-independent device discovery protocol which can be used by a network administrator to view information about other network devices directly attached to a particular network device. In addition, network management applications can retrieve the device type and SNMP-agent address of neighboring network devices. This enables applications to send SNMP queries to neighboring devices. CDP thus allows network management applications to discover devices that are neighbors of already known devices, such as neighbors running lower-layer, transparent protocols.

It is to be understood that the present invention is not limited to devices that are compatible with CDP. CDP runs on all media that support the Subnetwork Access Protocol ("SNAP"), including LAN and Frame Relay. CDP runs over the data link layer only. Each network device sends periodic messages to a multicast address and listens to the periodic messages sent by others in order to learn about neighboring devices and determine when their interfaces to the media go up or down. Each device also advertises at least one address at which it can receive SNMP messages. The advertisements contain holdtime information, which indicates the period of time a receiving device should hold CDP information from a neighbor before discarding it. With CDP, network management applications can learn the device type and the SNMP agent address of neighboring devices. This process enables applications to send SNMP queries to neighboring devices.

Once a switch cluster is formed, any of the switches in the cluster may be accessed by entering the IP address of the commander switch into a Web browser. The single password that is entered to log in to the commander switch also grants access to all the member switches in the cluster.

In one embodiment of the present invention, the method of creating a cluster of Ethernet switches depends on each particular network configuration. If the switches are arranged in a star topology, as in FIG. 8, with the commander switch at the center, all of the member switches may be added to the cluster at once. On the other hand, if the switches are connected in a daisy-chain topology, as in FIG. 9, the candidate switch that is connected to the commander switch is added first, and then each subsequent switch in the chain is added as it is discovered by CDP. If switches are daisy-chained off a star topology, as in the exemplary hybrid configuration shown in FIG. 10, all the switches that are directly connected to the commander switch may be added first, and then the daisy-chained switches may be added one at a time.

In embodiments of the present invention, there can be a maximum of sixteen switches in a cluster: fifteen member switches and one commander switch. If passwords are defined for the candidate member switches, the network administrator must know them all before they can be added to the cluster. In addition, a candidate switch according to embodiments of the present invention must not already be a member switch or a commander switch of another active cluster.

If the commander switch of a cluster fails, member switches continue forwarding but cannot be managed through the commander switch. Member switches retain the ability to be managed through normal standalone means, such as the console-port CLI, and they can be managed through SNMP, HTML, and Telnet after they have been assigned an IP address. Recovery from a failed command switch can be accomplished by replacing the failed unit with a cluster member or another switch. To have a cluster member ready to replace the commander switch, the network administrator must assign an IP address to another cluster member, and know the command-switch enable password for that switch.

According to embodiments of the present invention, when a cluster is formed, the commander switch automatically changes three parameters on all the member switches in the cluster: the host name, the enable password, and the SNMP community string. If a switch has not been assigned a host name, the commander switch appends a number to the name of the commander switch and assigns it sequentially to the member switches. For example, a commander switch named eng-cluster could name a cluster member switch eng-cluster-5. If a host name has already been assigned to a switch, the switch retains its host name.

Figure 11:
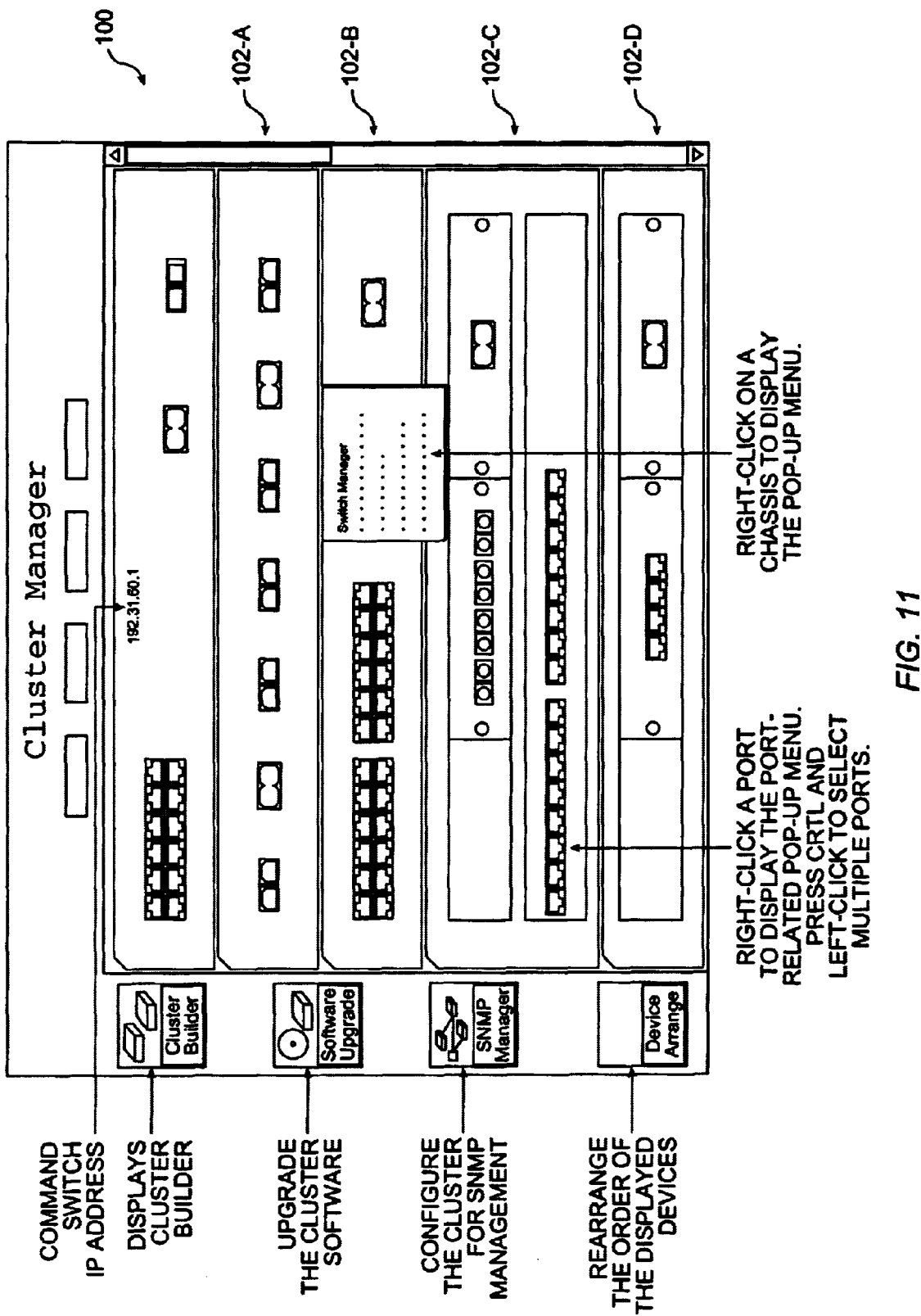
FIG. 11 is a sample configuration screen for a switch cluster according to one aspect of the present invention.

Once a cluster has been created, network management software such as the Cluster Manager™ program, available from the assignee of the present invention, may be used to monitor and configure the switches in the cluster. FIG. 11 shows a switch cluster with one commander switch 100 and four member switches 102-A–102-D as it is displayed on a sample Cluster Manager™ page.

One advantage of the present invention is that a network administrator need set only one IP address, one password, and one system SNMP configuration in order to manage an entire cluster of switches. A cluster can be formed from switches located in several different buildings on a campus, and may be linked by fiber optic, Fast Ethernet, or Gigabit Ethernet connections.

Clusters may be managed from a management station through ASCII terminal consoles, telnet sessions, SNMP management stations and Web Consoles. All configuration and management requests are first directed to the cluster commander. Any required authentication is done by the commander. If necessary, the commander acts as a redirector and forwards requests to the appropriate member switch and forwards the reply to the management station. According to embodiments of the present invention, a member switch can be in only one cluster at a time and can have only one commander. However, these restrictions are in no way limiting on the scope of the present invention, and some embodiments may not incorporate these restrictions.

There is no restriction on the type of connections between a commander switch and member switches. In one embodiment of the present invention, a cluster can be formed for a fully interconnected group of CDP neighbors. A network device can join a cluster when the network device is a CDP neighbor of the cluster. Without limitation, switches in a cluster may be interconnected using 10 Mbps Ethernet, 100 Mbps Fast Ethernet, or 1000 Mbps Gigabit Ethernet.

The primary external configuration and management interface to the cluster is a TCP/IP connection to the commander switch, HTTP, SNMP, and telnet protocols run on top of the IP stack in the operating system. Alternatively, the cluster may also be managed via the console port of the commander.

Thus, as shown in FIG. 7, a Web browser on the management station 104 communicates with the switch cluster 98 by establishing an HTTP connection to the commander switch 100. Special CLI commands help present output from the commander switch 100 to the browser in a format that is easily processed on the browser. Communication between the commander switch 100 and member switches 102-A–102-N is accomplished by the commander switch 100 translating the desired actions into commands the member switches 102-A–102-N would be able to interpret if they were acting as stand-alone switches, i.e., if they were not part of a cluster.

The commander switch 100 manages SNMP communication for all switches in the cluster 98. The commander switch 100 forwards the set and get requests from SNMP applications to member switches 102-A–102-N, and it forwards traps and other responses from the member switches 102-A–102-N back to the management station 104. In one embodiment of the present invention, read-write and read-only community strings are set up for an entire cluster. Community strings provide authentication in the exchange of SNMP messages. The commander switch appends numbers to the community strings of member switches so that these modified community strings can provide authentication for the member switches. When a new switch is added to the cluster, a community string is created for it from the community string for the cluster. Only the first read-only and read-write community strings are propagated to the cluster.

Figure 12:
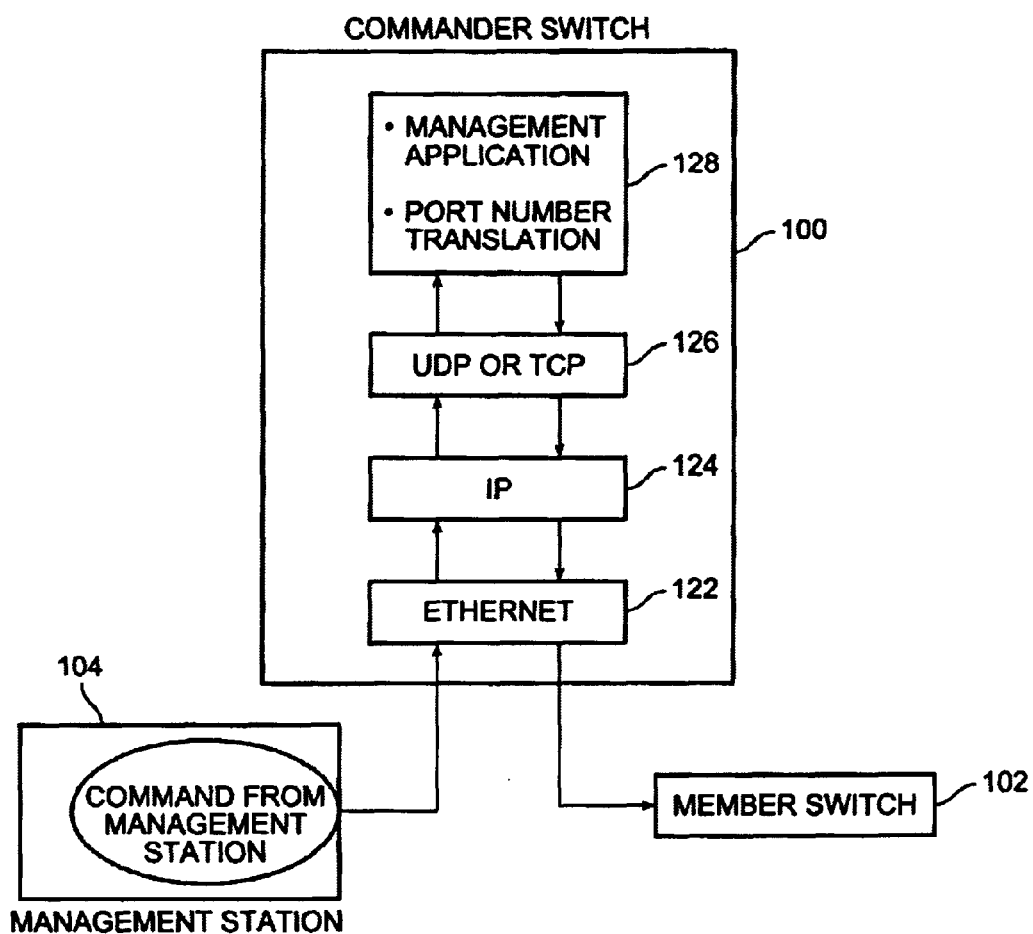
FIG. 12 is a block diagram of configuration data packet processing by a commander device according to one aspect of the present invention.

Configuration and management data packets are sent between the commander 100 and member switches 102-A–102-N via the network connection. The commander 100 identifies each member switch 102-A–102-N by the MAC address of the port on the member switch that is connected to the commander 100. FIG. 12 illustrates in block diagram form how a packet intended for a member switch is processed by the commander. A command from the management station 104 is received by the Ethernet module 122 of the commander switch 100. The command is processed at the IP layer 124, UDP or TCP layer 126, and Management Application layer 128 of the commander switch 100. The Management Application layer 128 determines that the command is intended for member switch 102, and performs redirection by translating the port number in the received command to the appropriate port for member switch 102. The redirected command flows down through the UDP or TCP layer 126, the IP layer 124, and the Ethernet layer 122 of the commander switch 100, and is passed on via Ethernet to the member switch 102.

Discovery of Candidate Switches—Overview

Discovery is the process by which network devices that are capable of becoming new members of a cluster are identified by the existing cluster. The commander and its member switches are called "members" of the cluster. Network devices that are capable of becoming new members of the cluster are referred to as "candidates."

According to embodiments of the present invention, a candidate must be a CDP neighbor of the commander or of a member switch (i.e. a switch that is already in the cluster). In one embodiment of the present invention, discovery of candidate switches occurs through CDP. However, it is to be understood that other protocols may be used to discover candidate devices.

The commander automatically discovers candidate switches that send CDP packets directly to the commander. The commander then produces a list of Ethernet addresses of candidate switches. As candidate switches become members of the cluster, they look for CDP packets from "downstream" devices. A device is downstream of a member if it is one CDP hop further away from the commander than is the member. An administrator may view the list of candidates and add candidates to the cluster through the commander console port, telnet CLI, a Web console or SNMP.

The commander applies rules to devices attached to the cluster to determine whether each is qualified to join the cluster. According to one embodiment of the present invention, in order to become a cluster candidate, a switch must meet the following qualification criteria: (1) it must be cluster-capable, (2) it must have HTTP capabilities and have CDP enabled, (3) it must be connected to a member of the existing cluster, (4) its connection must be STP forwarding at both ends, and (5) it must not be an active member of any other cluster. In addition, the enable password of the candidate must be either the same as the commander or known to the administrator who is adding the switch to the cluster.

The user must configure a switch to be the cluster commander. The commander will then examine CDP packets it receives on all interfaces to find candidate switches. The time it takes to discover all candidates depends on the length of CDP intervals that are set on the candidate switches. In one embodiment, the range for the CDP intervals is between 5 seconds and 15 minutes, with a default CDP interval of 1 minute. From a user interface on the network management station, the user is shown the current candidates for inclusion in the cluster. The first set of candidates will each be one CDP-hop from the commander switch.

Cluster formation commands provide a facility for defining a cluster. These include informational "show" commands that identify members (member switches) and potential members (candidate switches), and a configuration command (config-mode cluster) that is used to give the stack a name and add or delete members. These commands may be entered directly on the command line or used by the Web console to send commands from a web browser to the commander's firmware. In other embodiments of the present invention, it is also possible to form a cluster via SNMP.

Although switches may be individually added or removed from the cluster, the user interface according to embodiments of the present invention provides a suggested list of devices that can form a cluster (called the "suggested cluster"). By accepting the suggested cluster, the network administrator may add all candidates in a single operation, subject to the limit on the maximum number of member switches. When the number of candidates exceeds the maximum number of member switches, additional selection criteria are used to reduce the list to the maximum number. If the number of members in a cluster has not reached the maximum, the user may add a switch to the cluster. If the cluster is full, the user must remove a member switch from the cluster before adding another. The commander is informed that the qualified switch has been selected by a user for inclusion in the cluster. The first available member switch number is given to the member switch. At this point, the commander and the member switch may begin their communication. The commander will also add cluster-related commands to the configuration file of a member switch.

The user must have entered the enable password on the commander to alter the cluster's configuration. When the user adds a candidate switch to the cluster, the user is given the option to specify the enable password of that candidate switch. Provided that the command syntax is correct, this configuration change usually succeeds (if the network connection between the commander and the candidate is broken, the change will fail). Once a switch becomes part of a cluster, the commander sends it periodic test packets to validate authentication and sets the password of the member switch to be the same as the password of the commander. If the user entered the correct password at the time the switch was added to the cluster or the candidate switch does not have an enable password, the commander indicates that the member switch is functioning properly as part of the cluster in response to a request for cluster status. However, if the password is incorrect, an authentication error for that member switch is indicated in response to a request for cluster status. The configuration of the cluster is not saved until the user explicitly instructs the commander to save its configuration. When a configuration save is requested, the configuration of the commander and of each member switch is saved.

Some users may wish to build clusters automatically when they build a network using new switches. In such a situation, the commander can suggest to the user a set of switches that would form a legitimate cluster, which the user can then accept or reject. The suggested cluster, as determined by the commander, is presented to the user for approval. If the user fails to approve the suggested cluster, none of the suggested candidate switches is added to the cluster. The user must select candidates individually through the commander. If the user approves the suggested cluster, each member switch is added to the cluster normally.

Cisco™ Discovery Protocol

As has already been mentioned, one embodiment of the present invention uses the Cisco™ Discovery Protocol ("CDP"). CDP is a device discovery protocol that runs on Cisco™ network devices (e.g., switches, routers, bridges, communication servers). Using CDP, each network device sends periodic messages to a multicast address, and listens to the periodic messages sent by others in order to learn about neighboring devices and determine when their interfaces to the media go up or down. CDP runs over the data link only, and does not run on top of any network layer. Therefore, two systems that support different network layer protocols can learn about each other. CDP sends packets on LANs with the multicast address "0100.0ccc.cccc," except on IEEE 802.5 networks, where the packets are sent to the address "c000.0800.0000." The SNAP format for CDP packets is as follows:

| LLC | Org ID | HDLC protocol type |
|---|---|---|
| 0xaaaa03 | 0x00000c | 0x2000 |

A packet addressed to the CDP multicast address, but having a different 8-byte SNAP value, should be processed according to the different SNAP value, or discarded if the SNAP value is unknown. If CDP is disabled, packets received at the CDP address with the CDP SNAP value are discarded (i.e., not forwarded).

Figure 13:
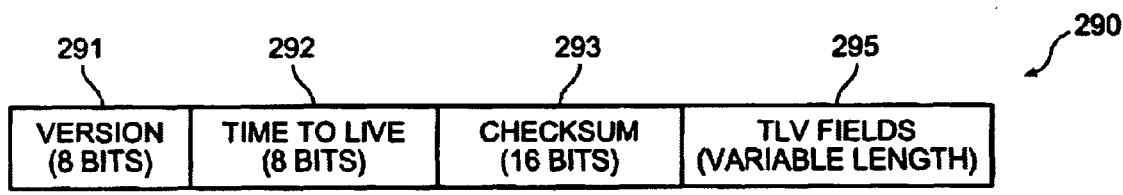
FIG. 13 is a block diagram illustrating the CDP packet format according to one aspect of the present invention.

FIG. 13 is a block diagram illustrating the CDP packet format according to one embodiment of the present invention. As shown in FIG. 13, CDP packet 290 includes an 8-bit Version field 291, followed by an 8-bit Time-to-live field 292, which is then followed by a 16-bit Checksum 293. Checksum field 293 is followed by a variable length list of Type-Length-Value ("TLV") fields 295.

Version field 291 contains an 8-bit value indicating the version of the CDP protocol of CDP packet 290. In one embodiment, Version field 291 may contain the values "0x01" (indicating CDP version 1) or "0x02" (indicating CDP version 2). Time-to-live field 292 indicates the length of time (in seconds) that a receiving network device should keep the information in CDP packet 290 before discarding it. In one embodiment, the default value for this field is 180 seconds. Checksum field 293 contains the "standard" IP checksum, with the modification that the odd byte at the end of an odd length message is used as the signed low 8 bits of an extra word, rather than as the unsigned high 8 bits.

Figure 14:
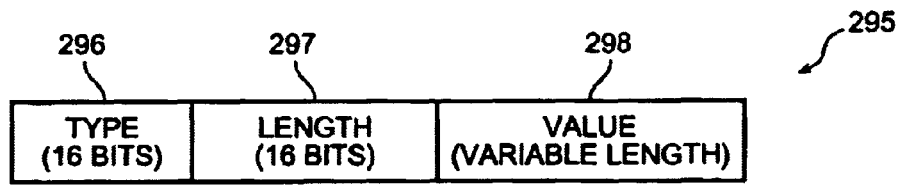
FIG. 14 is a block diagram illustrating the;format of TLV fields within CDP packets according to one aspect of the present invention.

FIG. 14 is a block diagram illustrating the format of TLV fields 295 within the CDP packets 290 shown in FIG. 13. As shown in FIG. 14, each TLV field 295 comprises a 16-bit Type field 296, a 16-bit Length field 297, and a variable length Value field 298. Type field 296 indicates what kind of TLV field 295 is being transmitted, and the possible values for the Type field 296 used in one embodiment of the present invention are described below. If a network device receiving a CDP packet 290 does not "understand" a TLV Type field 296, the network device skips the entire TLV field 295 and attempts to interpret the next TLV field 295. Length field 297 indicates the total length (in bytes) of TLV field 295, including the Type field 296, Length field 297, and Value field 298.

TLV fields 295 defined in one embodiment of the present invention are described in the following sections, indexed by the hexadecimal value of their Type fields 296.

The Device-ID TLV (0x0001) identifies the transmitting network device. This TLV is used so that different address references can be associated with the same device. It is in the form of a character string. The TLV length determines the length of the string. In one embodiment, the string is could be the subdomain name prepended to the domain name (i.e., subdomain.domain.com) or alternatively, it could be the device's hardware serial number in ASCII format.

The Address TLV (0x0002) contains a list of network layer addresses encoded in the same manner as used by the Inter-Domain Routing Protocol ("IDRP"), as known to 0 those skilled in the art. If the transmitting device is SNMP-manageable, the first address in the list must be an address at which the device will receive SNMP messages. If the device can receive SNMP messages, the list must be non-empty. The addresses advertised are typically ones assigned to the interface from which the CDP packet is sent. A network device may advertise all addresses for a given protocol suite, but is not required to do so. A device may optionally advertise one or more Loopback IP addresses.

The Port-ID TLV (0x0003) identifies the port on the network device from which the CDP packet is transmitted. This information is encoded as an ASCII character string. The TLV length determines the length of the string. The value of the MIB object ifName for the ifTable entry on which the CDP message is sent (i.e. "Ethernet0") should be used as the Value string.

The Capabilities TLV (0x0004) describes the functional capability of the transmitting network device. In one embodiment, it consists of a 4-byte Capability bit string field which may contain the following values in table 2, below:

TABLE 2

Capability TLV Bit String Values

| NETWORK DEVICE TYPE | VALUE | DESCRIPTION |
|---|---|---|
| Router | 0x01 | Currently performing level-3 routing for at least one network layer protocol. |
| TB Bridge | 0x02 | Currently performing level-2 transparent bridging. |
| SR Bridge | 0x04 | Currently performing level-2 source route bridging. An SRT bridge sets both this bit and the TB Bridge bit. |
| Switch | 0x08 | Provides layer-2 and/or layer-3 switching. |
| Host | 0x10 | Sends and receives packets for at least one network layer protocol. If the device is routing the protocol, this bit should not be set. |
| IGMP conditional filtering | 0x20 | The Bridge or Switch does not forward IGMP Report packets on non router-ports. |
| Repeater | 0x40 | Provides level-1 functionality. |

As the preceding table indicates, each bit in the 4-byte Capability bit string field may be set or cleared individually. Thus, a network device may set more than one bit in the field, if appropriate.

The Version TLV (0x0005) contains information about the software release version that the transmitting network device is executing. This information is in the form of a character string. The TLV length determines the length of the string. The Value field of the TLV is the same as the information returned when using the "show version" command-line command.

The Platform TLV (0x0006) describes the hardware platform of the transmitting network device. This information is encoded as an ASCII character string. The TLV length determines the length of the string.

The IP Network Prefix TLV (0x0007) contains a list of network prefixes of stub networks to which the transmitting device can forward IP packets. Each network prefix is formatted as a 4-byte network address followed by a 1-byte net mask length. Thus, the length of the value is a multiple of 5 bytes. This IP Network Prefix TLV can used in On Demand Routing ("ODR") applications.

The Protocol-Hello TLV (0x0008) specifies that a particular protocol has asked CDP to piggyback its "hello" messages within transmitted CDP packets. In one embodiment, the value of this TLV protocol has a length greater or equal to 5 and less than or equal to 32 bytes. The first 5 bytes are the protocol's 5-byte SNAP value, and contains three bytes of the manufactured-specific OUI value followed by two bytes of protocol-id. Depending on the protocol identified, additional bytes may be appended as part of the value. It should be noted that the protocol-id value is an EtherType value when the OUI is zero, and no additional bytes are appended. Multiple Protocol-Hello TLVs, each for a different protocol, may be included in one CDP packet.

All cluster-capable switches participate in sending and receiving the Cluster Management Protocol Hello. The cluster process registers its callback function to receive hello-protocol notifications. The Protocol Hello TLV field definitions are as shown in Table 3, below.

TABLE 3

Protocol Hello TLV Field Definitions

| Field Size in Bytes | Field Description |
| --- | --- |
| 4 | Sender's CMP address.<br>● 0x00000000 if this is a cluster member with no assigned CMP address.<br>● Commander's IP address if this is from the commander.<br>● Ignore if cluster member is false. |
| 2 | Upstream Member Number (ignore if cluster member is false) |
| 2 | Cluster member number.<br>● 0x0000 if commander<br>● 0xFFFF if unknown.<br>● Ignore if cluster member is false. |
| 1 | Sender's CMP version (0x00–0xFF) |
| 1 | Earliest CMP version sender can work with on the receiver (00x00–0xFF). Must be contiguous. If sender's version works with a receiver running version 1, not version 2, and with 3 & 4, its value is 3. |
| 1 | 8 bit flag mask:<br>● STP Forwarding: 0x01<br>● Cluster member: 0x02<br>● Fast Etherchannel member: 0x04<br>● Sending port is a proprietary Gigastack port: 0x08 |
| 1 | FEC number |
| 6 | Sender's commander's MAC address |
| 6 | Sender's Base MAC address |
| 1 | Number of hops from commander (ignore if cluster member is false). |
| 25 | Total size of defined fields (in bytes) |

When a CDP packet containing a protocol hello TLV is received by a network device, the notification message includes the following information from the CDP cache about the port of CDP sender: CDP device number, device name string, and port ID name string. It should be noted that the platform string is not accessible in this embodiment. The notification also includes the following payload and TLV information: payload length, pointer to the payload, OUI, protocol ID, and notification count.

Cluster Device Discovery Details

Figure 15:
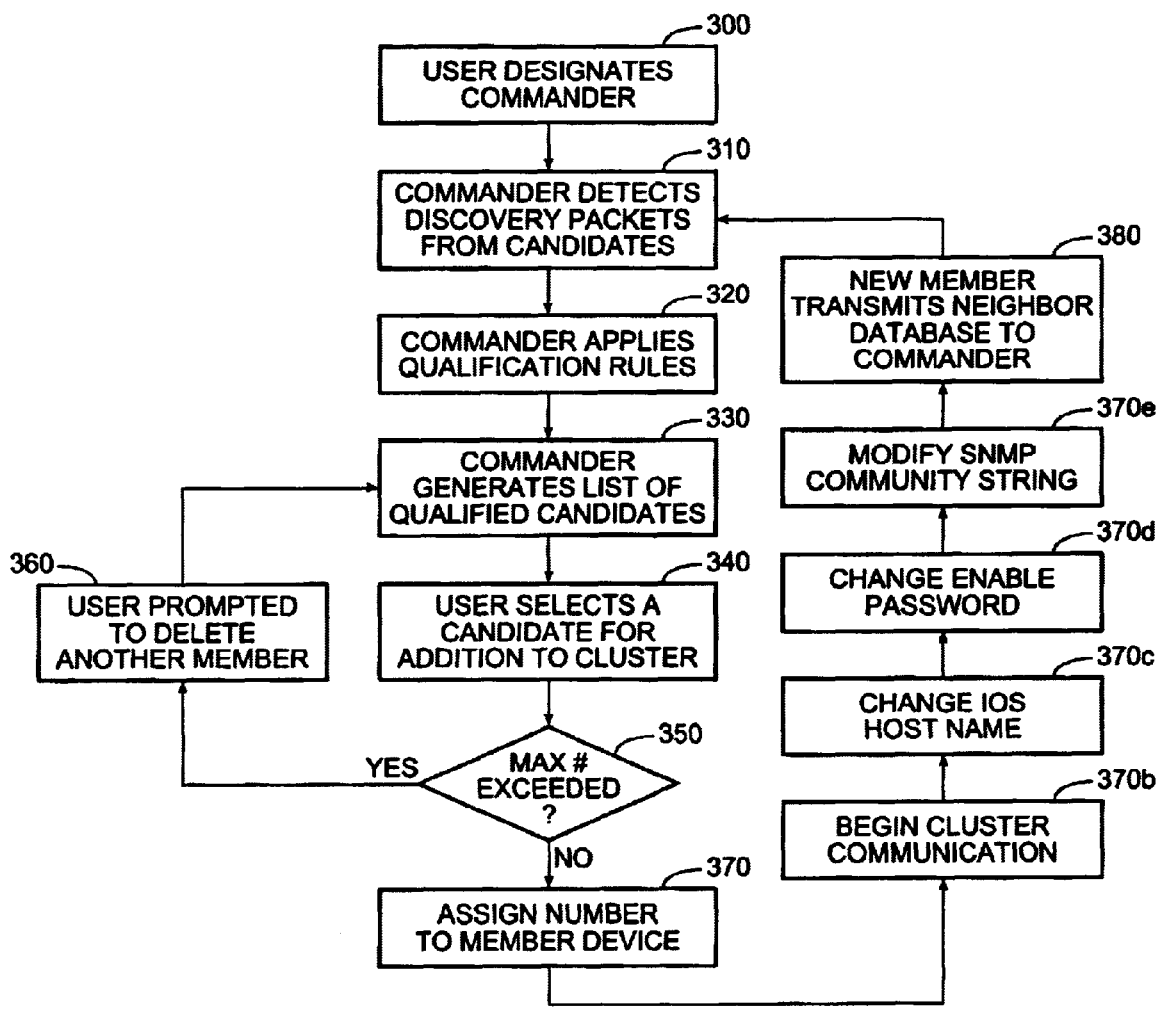
FIG. 15 is a block diagram illustrating the cluster device discovery and formation process according to one embodiment of the present invention.

FIG. 15 illustrates the process of cluster device discovery according to the one embodiment of the present invention. Referring now to FIG. 15, at step 300, a user designates a cluster device to be the commander device. In this embodiment, even before step 300, it is assumed that all network devices capable of being part of a cluster were already transmitting discovery packets at regular intervals. At step 310, the commander device detects discovery packets from candidate devices. At step 320, the commander device applies qualification rules to all such candidate devices to the cluster to determine whether each is qualified to join the cluster. At step 330, the commander device produces a list of Ethernet addresses of candidate switches that meet the qualification rules. At step 340, a user selects a candidate device from the list to be added to the cluster. At step 350, the commander devices checks whether the number of members in a cluster has reached the maximum. If the maximum number has been reached, at step 360 the user is prompted to remove a member switch from the cluster before allowed to add another member, and the process loops back to step 330.

If the maximum number of members in a cluster has not been reached, the selected device is added to the cluster at steps 370a–370e. At step 370a, the first available member switch number is assigned to the selected member switch. At step 370b, the commander device and the new member begin their communication. At step 370c, the commander device changes the IOS hostname of the new member. At step 370d, the commander device changes the enable password of the new member. Finally, at step 370e, the commander device modifies the SNMP community strings of the new member. At step 380, the new member sends its neighbor database to the commander. At this point, the process loops back to step 310.

Each cluster-capable device according to an embodiment of the present invention maintains a small database (totaling approximately 200 bytes per neighbor) of information about its CDP neighbors. There are three kinds of neighbor updates. During a "Full Neighbor Update," a cluster member sends information about all its CDP neighbors to the commander. Full Neighbor Updates are transmitted from all members to the commander at regular intervals (typically on the order of every five minutes). In contrast, during a "Partial Neighbor Update," a member sends information only about new CDP neighbors or CDP neighbors whose information has changed. These are sent only when a member recognizes that a change has occurred in its stored information. In one embodiment, when a member detects a change in its neighbor database, it sends the partial update after a delay (typically in the order of 8–10 seconds) in an attempt to collect multiple changes and to reduce the number of updates. Finally, during a "Remove Neighbor Update," a member sends a list of CDP neighbors that have been removed from its cache. Upon receipt of a "Remove Neighbor Update," the commander removes these neighbors from its cache.

In one embodiment, network devices send CDP packets periodically (typically every 60 seconds, but this value can be modified by a user depending on the requirements of each particular application). As mentioned earlier, they advertise a time-to-live (in seconds) which indicates the length of time after receipt upon which a receiving device must discard the information contained in the packet. The time-to-live value should always be larger than the periodic transmission timer. Moreover, the periodic timers should be "jittered" as known to those skilled in the art to avoid synchronization effects. CDP packets should be sent with a time-to-live that is non-zero after an interface is enabled, and a time-to-live of "0" immediately prior to an interface being idled down. This practice provides for quick state discovery.

Upon receipt of a CDP packet, a network device caches the information contained in the packet, and the cached information is then available to network management functions. Typically, CDP packets are not forwarded. If any of the information in the received CDP packet has changed from the last received CDP packet, the new information is cached and the older information is discarded even if its Time-to-live has not yet expired. At link-up time, network devices should send three CDP packets at one-second intervals. Doing so protects against the delay caused by initial loss of packets when a link is restarted.

In one embodiment of the present invention, Intra-Cluster Communication ("ICC") packets are transmitted using the UDP/IP protocol. In case any UDP packets are lost, the members periodically send full neighbor updates to the command switch. Upon detecting a neighbor change, a cluster member sends partial neighbor updates including just the changed neighbors to the command switch.

In this embodiment of the present invention, the cluster commander switch transmits ICC "heartbeat" packets to each member switch in the cluster at predetermined intervals (e.g., 10 seconds). Also at predetermined intervals (e.g., 10 seconds), each member switch sends its own heartbeat to the commander. Each switch's heartbeat contains information about the current state of the switch and status of all its ports. If the commander fails to receive heartbeats from a member switch for a predetermined interval (e.g., 60 seconds) or cannot set up any other communication with it, it marks the member switch as inactive. The commander will stop sending heartbeats, and the user will notice at the user interface that the member switch is inactive. The commander stops accepting or forwarding any configuration commands for the inactive member switch until the cluster begins receiving CDP packets from that switch again, at which time the commander resumes sending heartbeats to the member switch.

If a member switch fails to receive heartbeats from its commander for a predetermined interval (e.g., 60 seconds), the member switch recognizes that it has lost connectivity to the commander. This can happen if the link has been broken, the commander has rebooted, or an STP topology change has put the member switch more than one CDP hop from the cluster. The member switch retains knowledge of its commander and continues to send CDP packets with its cluster member information, but stops sending heartbeats. If the member switch begins to receive heartbeats from the commander again, it will resume sending its own heartbeats.

If a member switch is removed from a cluster, all member switches that reach the commander through the member switch that has just been removed become inactive and cannot be reached from the commander. In embodiments of the present invention, the best way to remove a member switch from a cluster is to issue a command at the commander while the member switch is still an active member of the cluster. Configuration commands that were entered when the member switch was added to the cluster will be undone. The record of that member switch is expunged from the commander. If the member switch had been previously separated from the commander, the member switch continues to think it is part of the cluster. In this case, the user must connect to the console of the separated member switch and issue a command to remove the member switch from the cluster.

Every cluster-capable network device according to one embodiment of the present invention maintains a CDP neighbor database even though it is not currently a member of any cluster. In this way, its neighbor information is immediately accessible when it joins a cluster. Otherwise, the user would typically have to wait between one and fifteen minutes for the neighbor database to be populated, which slows configuration.

Periodically, each cluster member sends its cluster and neighbor information to the commander, which maintains a complete database for use in configuration and display of the current state of the cluster. The commander sends heartbeat datagrams over UDP to each cluster member, and independently, each cluster member sends heartbeat datagrams over UDP to the commander, allowing each to diagnose communication breakdowns within the cluster.

Data Structures

Each cluster-capable device has one cluster_member data structure to store its own information, which is organized as shown below (in the "C" language format known to those skilled in the art).

```
typedef struct cluster_member_ {
    ushort mbr_num;              /* Number assigned to this member
                                    0xFFFF if non-member */
    ushort tp_flags;             /* CMP Transport flags for this member */
    uchar mbr_flags;             /* Active - 0x01, Inactive 0x00 */
    uchar mbr_heartbeat;         /* 0 each time a heartbeat is rcvd from cmdr increment
                                    each time a heartbeat is sent. Should be 0 or 1 most
                                    of the time. */
    uchar mbr_numhops;           /* Number of CDP hops away from commander */
    uchar mbr_update;            /* Counter for automatic neighbor updates */
    ipaddrtype mbr_cmpaddr;      /* assigned CMP address */
    ipaddrtype mbr_ipaddr;       /* regular IP address */
    ipaddrtype cmdr_ipaddr;      /* IP address of member's commander */
    ipaddrtype cmdr_cmpaddr;     /* CMP address assigned to commander */
```

-continued

```
uchar cmbr_macaddr[ IEEEBYTES ] ;      /* MAC addr of member's commander */
uchar mbr_macaddr[ IEEEBYTES ] ;       /* store instead of get each time */
uchar mbr_CmdPortID[ CDP_MAX_PORT_ID_STR_LEN ] ;
uchar platform_name[ CDP_MAX_PLATFORM_STR_LEN ] ;
uchar host_name[ MAX_HOST_NAME ] ;
uchar cluster_name[ MAX_CLUSTER_NAME ] ;
} cluster_member;
```

The mbr_MACAddr, mbr_ipaddr, platform_name and host_name fields are the only fields valid for cluster non-members. The mbr_numhops field is not valid for a non-member because the device could be a neighbor of more than one cluster. The command port of a member is the port which is the fewest hops from the commander regardless of the STP state of the link.

A cluster_neighbor data structure is created for each CDP neighbor seen on a cluster-capable switch. This information is stored on each cluster-capable switch for all its CDP neighbors so that there is no waiting for new CDP information if a device is added to the cluster. This information is sent from each cluster member to the commander at periodic intervals or upon request from the commander, along with information from the cluster_member structure and the CDP cache.

```
typedef struct cluster_neighbor_ {
ipaddrtype cn_cmpaddr;                         /* IP address assigned to the neighbor */
ipaddrtype cn_ipaddr;                          /* Neighbors assigned IP address */
ulong cn_capabilities;                         /* reg_invoke_cdp_lookup_cache_info_1 */
ushort cn_mbrnum;                              /* 0xFFFF if not a stack member */
uchar cn_qualification;                        /* 0 Qualified
                                                  1 Not cluster capable (no CMP hello)
                                                  2 Not cluster capable (ver mismatch)
                                                  3 cluster capable, STP-BLK at either end
                                                  belongs to a different stack */
uchar cn_qualification_note;                   /* 0x01 Has Configured IP address
                                                  0x02 Saw > 1 CDP neighbor, not pt2pt
                                                  0x04 Sender port is a Giga-bit port */
uchar cn_sender_numhops;                       /* 0-MAX_CLUSTER_SIZE, number of CDP hops to
                                                  commander */
uchar cn_mbr_fec_number;                       /* 0 if single port, 1-MAX_FEC if grpd */
uchar cn_fec_numher;                           /* 0 if single port, 1-MAX_FEC if grpd */
uchar cn_pad;                                  /* Keeps it even */
uchar cn_macaddr[ IEEEBYTES ] ;                /* MAC address of CDP sender */
uchar cn_port_macaddr[ IEEEBYTES ] ;           /* MAC address of CDP sender port */
uchar cn_cmdr_macaddr[ IEEEBYTES ] ;           /* MAC addr of sender's commander */
uchar cn_portID[ CDP_MAX_PORT_ID_STR_LEN ] ;   /* CDP sender Port ID */
uchar cn_mbr_portID[ CDP_MAX_PORT_ID_STR_     /* receiving port's ID */
LEN ] ;
uchar cn_hostname[ MAX_HOST_NAME ] ;           /* Sender platform string */
uchar cn_platform_name[ CDP_MAX_PLATFORM_STR_LEN ] ;
} cluster_neighbor;
```

-continued

```
idbtype * cn_idb;                /* port's idb where CDP pkt
                                    arrived */
ulong cn_cdp_device_number;      /* required to access CDP cache
                                    info */
ulong age;                       /* ulong for alignment - 0 if current*/
cluster_neighborcnbr;            /* cluster neighbor information */
};
```

At periodic intervals (set to equal eight seconds in one embodiment) a cluster member sets the age field to "1" for each neighbor. The member then "walks" the CDP cache, setting the age time to "0" for each neighbor it finds that is still in the CDP cache. When it has finished walking the cache, the member deletes any neighbor whose age time is On network devices according to one embodiment of the present invention, the member's neighbor information is stored in a linked list along with a pointer to the receiving port's "swidb" switch database, the CDP device number used to match the CDP cache entry, and a neighbor age indicator, as shown below.

```
typedef struct member_neighbor_member_neighbor;
struct member_neighbor_ {
member_neighbor*next;         /* ptr to the next cluster neighbor. */
``` still set to "1" meaning that the neighbor is no longer seen in the CDP cache.

Each member allocates enough memory space for the member structure and for each neighbor structure. It then walks the CDP cache again, filling in a neighbor structure for non-cluster-capable neighbors and copying the neighbor structure for cluster-capable neighbors. The neighbor structure is matched to the CDP cache entry through the cn_cdp_device_number field of the member_neighbor structure.

In one embodiment, the members are kept in a linked list on the commander in member number order. Pointers to the member structures are also kept in a hash table of size 16.

In this embodiment, the hash algorithm is simple, equal to the member number modulo 16. The hash table allows quick access to a member, whereas the linked list allows the cluster members to be displayed easily. The member data structure on the commander is as follows:

```
typedef struct cmdr_member_cluster_mbr;
struct cmdr_member_
{
cluster_mbr *next;           /* Used for memberQ */
cluster_mbr *nextInChain;    /* Used for links within hash chain */
cluster_member cmbr;
cluster_status status;       /* Used to store cluster status
                                information */
};
```

Similarly, the neighbors are kept in a linked list and in a 32-entry hash table whose hashing algorithm performs a bitwise exclusive or ("XOR") of the three low order bytes of the MAC address and uses the lowest 5 bits of the result as the index into the hash table. An exact match of a neighbor must match the connected member number, the MAC address, and the portID of the port connecting to that member. The hash table allows quick access to a particular neighbor, and the linked list allows neighbors to be displayed easily. The neighbor data structure of the commander is as follows:

```
typedef struct cluster_nbr_cluster_nbr;
struct cluster_nbr_
{
cluster_nbr *next;
cluster_nbr *nextInChain;
ushort mbrnum;              /* # cluster mbr to which this device is
                               connected */
ushort age;
cluster_neighbor cnbr;
};
```

Neighbors are added to or updated on this list when the commander receives a neighbor update from a member. A Full Neighbor Update from a member always contains information about every current neighbor. Full Neighbor Updates allow the commander to eliminate old neighbors. When the commander receives a neighbor update from a member, it walks the linked list of neighbors, setting the age time to "1" on each neighbor of that member. As it updates the neighbors in the neighbor update, it sets the age time to "0" for that neighbor. When all neighbors have been processed, the commander walks the neighbor linked list again. Each neighbor of that member which still has the age field set to "1" is deleted. When a Remove Neighbor information is received from a member, the commander removes all the neighbors from its cache listed in this message.

In one embodiment of the present invention, the commander of a cluster is also a member of a cluster. Since both of these "logical" devices are really the same "physical" device, their intra-cluster communication is slightly different from that between a separate member and its commander. The commander-as-commander does not send heartbeats to the commander-as-member. However, the commander-as-member does send status heartbeats and neighbor updates to its commander-as-commander. When the function that sends the UDP packet recognizes that it is sending a packet from itself as member to itself as commander, it calls the correct ICC receiving function directly.

According to embodiments of the present invention, each cluster-capable network device advertises its clustering capability via the CDP Protocol Hello TLV field described earlier. Every cluster-capable network device receives the CDP Protocol Hello information, saves it into a cluster_neighbor data structure, and links it into the neighbor database.

Moving and Removing Cluster Devices

If one member device moves its connection to the cluster from one port on a second member device to another port on the second member device (this could be done either physically or through a Spanning Tree topology change), the second member device updates its local information and passes that information on to the commander. The second member device uses the first network device's base MAC address (from the Protocol Hello) to identify the first network device's CDP information arriving on a different port and makes the appropriate changes in the first network device's cluster_neighbor data structure. The neighbor may appear to be on both ports until it ages out of the CDP cache on the first port.

If a first member network device moves its connection to the cluster from a second network device to a third network device (this could be done physically or through a Spanning Tree topology change), the change must be made at the commander level. Eventually, the second network device ages it from its CDP cache, which the second network device notices when it tries to collect CDP information to send to the commander. When the commander receives a neighbor update from the second network device, the first network device will not be in it, so the commander will remove that neighbor entry from its list. Meanwhile, the third network device begins to receive CDP packets from the first network device, which it sends to the commander.

When a member switch receives a Bootstrap message with address as ZERO, it alters its cluster_member data structure to remove or zero out appropriate fields. It removes cluster member information from its CDP Protocol Hello TLV and stops sending heartbeats. It then discards any heartbeat packets it receives from the commander after receiving this command.

The commander must remove each member switch by sending a CMP Bootstrap message with address as ZERO. It then stops sending heartbeats and discards any heartbeats it receives from old cluster members. The commander clears out all its queues, freeing memory space allocated for neighbors and members. It then removes its udp_receiver functions and resets its own cluster_member information. It also calls a function to notify other code subsets that the commander has been removed from the configuration.

Automatic discovery of cluster-capable devices that can be added to the cluster takes all guesswork out of adding them to the cluster. The present invention makes it clear to the user which devices are cluster-capable and of those, which are free to be added. In one embodiment of the present invention, a device can belong to only one cluster. However, other embodiments of the present invention may allow a device to belong to more than one cluster.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for discovering and configuring network devices into a cluster, comprising:
   detecting discovery packets from candidate devices;
   applying qualification rules to the discovery packets received from the candidate devices to determine whether any of the candidate devices is qualified to join the cluster, the qualification including that the candidate device is not an active member of another cluster; and
   adding one or more the candidate devices to the cluster to be managed and configured via a commander network device of the cluster.

2. The method according to claim 1, wherein at least one of the network devices is a LAN switch.

3. A method for configuring a plurality of network devices into a single cluster capable of being managed via one of the network devices, comprising:
   receiving a command designating one of the network devices as the cluster commander device;
   receiving a command designating the remaining network devices as candidate devices;
   receiving discovery packets at the cluster commander device from each of the candidate devices;
   determining whether each of the candidate devices is qualified to join the cluster by applying a set of qualification rules, the qualification including that the candidate device is not an active member of another cluster; and
   presenting a list of the candidate devices qualified to join the cluster to a user.

4. The method of claim 3, further comprising:
   receiving a command at the cluster commander device to add one of the candidate devices to the cluster;
   determining whether the number of network devices in the cluster has reached a maximum value; and
   adding the candidate device to the cluster if the maximum value has not been reached.

5. The method according to claim 4, wherein the cluster commander device is a LAN switch.

6. The method according to claim 4, wherein the cluster commander device and the candidate devices are LAN switches.

7. The method according to claim 3, wherein the cluster commander device is a LAN switch.

8. The method according to claim 3, wherein the cluster commander device and the candidate devices are LAN switches.

9. The method according to claim 3, further comprising: presenting a list of existing member devices of the cluster.

10. The method according to claim 3 wherein the candidate network devices periodically send the discovery packets.

11. The method according to claim 10 wherein the candidate network devices send the discovery packets to a multicast address.

12. The method according to claim 3 wherein the discovery packets are in accordance with a Data Link Layer discovery protocol.

13. An apparatus for discovering and configuring network devices into a cluster, comprising:
   means for detecting discovery packets from candidate devices;
   means for applying qualification rules to the discovery packets received from the candidate devices to determine whether any of the candidate devices is qualified to join the cluster, the qualification including that the candidate device is not an active member of another cluster; and
   means for adding one or more of the candidate devices to the cluster to be managed and configured via a commander network device of the cluster.

14. The apparatus according to claim 13, wherein at least one of the network devices is a LAN switch.

15. An apparatus for configuring a plurality of network devices into a single cluster capable of being managed via one of the network devices, comprising:
   means for receiving a command designating one of the network devices as the cluster commander device;
   means for receiving a command designating the remaining network devices as candidate devices;
   means for receiving discovery packets at the cluster commander device from each of the candidate device;
   means for determining whether each of the candidate device is qualified to join the cluster by applying a set of qualification rules, the qualification including that the candidate device is not an active member of another cluster; and
   means for presenting a list of the candidate devices qualified to join the cluster to a user.

16. The apparatus of claim 15, further comprising:
   means for receiving a command at the cluster commander device to add one of the candidate devices to the cluster;
   means for determining whether the number of network devices in the cluster has reached a maximum value; and
   means for adding the candidate device to the cluster if the maximum value has not been reached.

17. The apparatus according to claim 16, wherein the cluster commander device is a LAN switch.

18. The apparatus according to claim 16, wherein the cluster commander device and the candidate devices are LAN switches.

19. The apparatus according to claim 15, wherein the cluster commander device is a LAN switch.

20. The apparatus according to claim 15, wherein the cluster commander device and the candidate devices are LAN switches.

21. The apparatus according to claim 15, further comprising:
   means for presenting a list of existing member devices of the cluster.

22. The apparatus according to claim 15 wherein the candidate network devices periodically send the discovery packets.

23. The apparatus according to claim 22 wherein the candidate network devices send the discovery packets to a multicast address.

24. The apparatus according to claim 15 wherein the discovery packets are in accordance with a Data Link Layer discovery protocol.

25. An apparatus for discovering and configuring network devices into a cluster, comprising:
   discovery protocol logic for detecting discovery packets from candidate devices;
   qualification rule circuitry for determining whether any of the candidate devices is qualified to join the cluster, the qualification including that the candidate device is not an active member of another cluster; and cluster management logic for adding one or more of the candidate devices to the cluster to be managed and configured via a commander network device of the cluster.

26. The apparatus according to claim 25, wherein at least one of the network devices is a LAN switch.

27. An apparatus for configuring a plurality of network devices into a single cluster capable of being managed via one of the network devices, comprising:

logic for designating one of the network devices as a cluster commander device;

logic for designating the remaining network devices as candidate devices;

logic for receiving discovery packets at the cluster commander device from each of the candidate devices;

qualification rules for determining whether each of the candidate devices is qualified to join the cluster, the qualification including that the candidate device is not an active member of another cluster; and logic for generating a list of the candidate switches qualified to join the cluster for display to a user.

28. The apparatus of claim 27, further comprising:

a user interface for receiving a command at the cluster commander device to add one of the candidate devices to the cluster;

logic for determining whether the number of network devices in the cluster has reached a maximum value; and circuitry for adding the candidate device to the cluster if the maximum value has not been reached.

29. The apparatus according to claim 28, wherein the cluster commander device is a LAN switch.

30. The apparatus according to claim 28, wherein the cluster commander device and the candidate devices are LAN switches.

31. The apparatus according to claim 27, wherein the cluster commander device is a LAN switch.

32. The apparatus according to claim 27, wherein the cluster commander device and the candidate devices are LAN switches.

33. A program storage device readable by a machine, tangibly embodying a program of instructions executable by the machine to perform a method for discovering and configuring network devices into a cluster, the method comprising:

detecting discovery packets from candidate devices;

applying qualification rules to the discovery packets received from the candidate devices to determine whether any of the candidate devices is qualified to join the cluster;

the qualification including that the candidate device is not an active member of another cluster; and adding one or more of the candidate devices to the cluster to be managed and configured via a commander network device of the cluster.

34. A program storage device readable by a machine, tangibly embodying a program of instructions executable by the machine to perform a method of logically configuring network devices into a cluster, the method comprising:

receiving at a first network device one or more packets containing information indicating that a second network device is capable of belonging to the cluster;

storing the information within the first network device;

linking the information into a neighbor network device database in the first network device;

determining if the second network device is not currently a member of a different cluster before adding the second network device to the cluster; and adding the second network device to a cluster of network devices which may be managed and configured via the first network device.

35. A program storage device readable by a machine, tangibly embodying a program of instructions executable by the machine to perform a method for configuring a plurality of network devices into a single cluster capable of being managed via one of the network devices, the method comprising:

receiving a command designating one of the network devices as the cluster commander device;

receiving a command designating the remaining network devices as candidate devices;

receiving discovery packets at the cluster commander device from each of the candidate devices;

determining whether each of the candidate devices is qualified to join the cluster by applying a set of qualification rules, the qualification including that the candidate device is not an active member of another cluster; and presenting a list of the candidate devices qualified to join the cluster to a user.

36. A method of logically configuring network devices into a cluster, comprising:

receiving at a first network device one or more packets containing information indicating that a second network device is capable of belonging to the cluster;

storing the information within the first network device;

linking the information into a neighbor network device database in the first network device;

determining if the second network device is not currently a member of a different cluster before adding the second network device to the cluster; and adding the second network device to a cluster of network devices which may be managed and configured via the first network device.

37. The method according to claim 36, wherein the first network device is a LAN switch.

38. The method according to claim 36, wherein the first network device and the second network device are LAN switches.

39. The method according to claim 36, wherein the first network device is a LAN switch.

40. The method according to claim 36, wherein the first network device and the second network device are LAN switches.

41. An apparatus of logically configuring network devices into a cluster, comprising:

means for receiving at a first network device one or more packets containing information indicating that a second network device is capable of belonging to the cluster;

means for storing the information within the first network device;

means for linking the information into a neighbor network device database in the first network device;

means for determining if the second network device is not currently a member of a different cluster; and means for adding the second network device to a cluster of network devices which may be managed and configured via the first network device.

42. The apparatus according to claim 41, wherein the first network device is a LAN switch.

43. The apparatus according to claim 41, wherein the first network device and the second network device are LAN switches.

44. The apparatus according to claim 41, wherein the first network device is a LAN switch.

45. The apparatus according to claim 41, wherein the first network device and the second network device are LAN switches.

46. An apparatus of logically configuring network devices into a cluster, comprising:

discovery protocol logic for receiving at a first network device one or more packets containing information indicating that a second network device is capable of belonging to the cluster;

memory storage for storing the information within the first network device;

database linking logic for linking the information into a neighbor network device database in the first network device;

circuitry for determining if the second network device is not currently a member of a different cluster; and circuitry for adding the second network device to a cluster of network devices which may be managed and configured via the first network device.

47. The apparatus according to claim 46, wherein the first network device is a LAN switch.

48. The apparatus according to claim 46, wherein the first network device and the second network device are LAN switches.

49. The apparatus according to claim 46, wherein the first network device is a LAN switch.

50. The apparatus according to claim 46, wherein the first network device and the second network device are LAN switches.

* * * * *

UNITED STATES PATENT AND TRADEMARK OFFICE
CERTIFICATE OF CORRECTION

PATENT NO. : 6,636,499 B1
DATED : October 21, 2003
INVENTOR(S) : Mary G. Dowling It is certified that error appears in the above-identified patent and that said Letters Patent is hereby corrected as shown below:

Column 7,
Line 22 between "and" and "server" insert -- a --.

Column 18,
Line 2, between "of" and "CDP" insert -- the --.

Column 21,
Line 2, replace "cmbr_macaddr[ IEEEBYTES];" with -- cmdr_macaddr [ IEEEBYTES]; --.
Second table, replace "cn_fec_numher;" with -- cn_fec_number; --.

Signed and Sealed this

Eighth Day of June, 2004

JON W. DUDAS
*Acting Director of the United States Patent and Trademark Office*